US 6,561,824 B1

(12) United States Patent
Beckham et al.

(10) Patent No.: US 6,561,824 B1
(45) Date of Patent: *May 13, 2003

(54) MEDIA CONNECTOR INTERFACE FOR ELECTRICAL APPARATUS

(75) Inventors: D. Scott Beckham, Park City, UT (US); Greg A. Putnam, West Jordan, UT (US); Lorraine Bolt, Orem, UT (US); Stephen C. Aldous, Salt Lake City, UT (US); Guy M. Dake, Sandy, UT (US); James B. Henrie, Riverton, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/357,017

(22) Filed: Jul. 19, 1999

Related U.S. Application Data

(60) Continuation of application No. 08/976,819, filed on Nov. 24, 1997, now abandoned, which is a continuation-in-part of application No. 08/689,715, filed on Aug. 16, 1996, now Pat. No. 5,727,972, which is a continuation of application No. 08/291,277, filed on Aug. 16, 1994, now Pat. No. 5,547,401, which is a continuation-in-part of application No. 08/040,656, filed on Mar. 31, 1993, now Pat. No. 5,338,210, which is a continuation-in-part of application No. 07/974,253, filed on Nov. 10, 1992, now abandoned, which is a division of application No. 07/866,670, filed on Apr. 8, 1992, now Pat. No. 5,183,404.

(51) Int. Cl.[7] .............................................. H01R 13/44
(52) U.S. Cl. ....................................................... 439/131
(58) Field of Search ................................. 439/131, 676, 439/668, 669, 638; 361/727

(56) References Cited

U.S. PATENT DOCUMENTS 1,780,847 A * 11/1930 Smith ........................ 174/59
2,445,244 A * 7/1948 Seaver
2,518,812 A * 8/1950 Oswald (List continued on next page.)

FOREIGN PATENT DOCUMENTS

| CH | 682961 | * 12/1993 | |
| DE | 0 355 413 | 7/1989 | |
| JP | 54-38587 | * 3/1979 | ................. 439/651 |
| JP | 58-34370 | 5/1983 | |
| JP | 61-256850 | 11/1986 | |
| WO | WO 95/13633 | 5/1995 | |

OTHER PUBLICATIONS

P.E. Knight and D.R. Smith, IBM Technical Disclosure, vol. 25, No. 1, p. 370, Jun. 1982.
IBM Technical Disclosure, Perkins, vol. 7, No. 6, p 424, Nov. 1964.*
IBM Technical Disclosure, vol. 32, No. 10B, p 83, Mar. 1990.*

*Primary Examiner*—Neil Abrams
(74) *Attorney, Agent, or Firm*—Workman, Nydegger & Seeley

(57) ABSTRACT

An electrical apparatus has an aperture block either retractably mounted or detachably mounted thereto. The aperture block has an aperture extending therethrough. The first end of a contact wire is disposed within the aperture while the opposed second end of the contact wire is coupled to the internal circuitry of the electrical apparatus. The aperture has a configuration complementary to the transverse cross section of a physical/electrical media plug. The media plug includes a contact block having a slot formed in the end that leads to a metal contact. As the media plug is inserted into the aperture, the first end of the contract wire is biased against the metal contact forming electrical connection between the media plug and the electrical apparatus. The aperture is also configured with grooves that releasably capture a flexible retention clip mounted on the pin block, thereby enabling mechanical engagement between the media plug and the aperture block.

57 Claims, 28 Drawing Sheets

U.S. PATENT DOCUMENTS

| | | | | |
|---|---|---|---|---|
| 2,916,720 A | | 12/1959 | Steans | 339/91 |
| 3,014,160 A | * | 12/1961 | Brogden | |
| 3,289,149 A | * | 11/1966 | Pawloski | |
| 3,433,886 A | * | 3/1969 | Myers | |
| 3,757,102 A | * | 9/1973 | Roberts | |
| 3,771,098 A | * | 11/1973 | Dempsey | |
| 3,794,956 A | * | 2/1974 | Dubrevil | |
| 4,059,321 A | * | 11/1977 | Rasmussen et al. | 174/48 |
| 4,186,988 A | | 2/1980 | Kobler | 339/176 |
| 4,241,974 A | | 12/1980 | Hardesty | 339/154 |
| 4,303,296 A | | 12/1981 | Spaulding | 339/122 |
| 4,352,492 A | | 10/1982 | Smith | 273/1 |
| 4,407,559 A | | 10/1983 | Meyer | 339/126 |
| 4,428,636 A | | 1/1984 | Kam et al. | 339/97 |
| 4,511,198 A | * | 4/1985 | Mitchell et al. | |
| 3,368,181 A | * | 2/1986 | Gimpel | |
| 4,710,136 A | | 12/1987 | Suzuki | 439/374 |
| 4,778,410 A | | 10/1988 | Tanaka | 439/676 |
| 4,809,360 A | * | 2/1989 | Kraft | |
| 4,915,648 A | | 4/1990 | Takase et al. | 439/490 |
| 5,132,877 A | * | 7/1992 | Branar et al. | 439/676 |
| 5,139,439 A | | 8/1992 | Shie | 439/359 |
| 5,183,404 A | | 2/1993 | Aldous et al. | 439/55 |
| 5,184,202 A | | 2/1993 | Kaneda et al. | 361/395 |
| 5,336,099 A | | 8/1994 | Aldous et al. | 439/131 |
| 5,338,210 A | | 8/1994 | Beckham et al. | 439/131 |
| 5,391,094 A | | 2/1995 | Kakinoki et al. | 439/638 |
| 5,411,405 A | | 5/1995 | McDaniels et al. | 439/131 |
| 5,481,616 A | | 1/1996 | Freadman | 381/90 |
| 5,499,923 A | | 3/1996 | Archibald et al. | 439/26 |
| 5,505,633 A | | 4/1996 | Broadbent | 439/329 |
| 5,509,811 A | | 4/1996 | Hormic | 439/55 |
| 5,538,442 A | | 7/1996 | Okada | 439/676 |
| 5,547,401 A | | 8/1996 | Aldous et al. | 439/676 |
| 5,561,727 A | | 10/1996 | Akita et al. | 385/88 |
| 5,562,504 A | | 10/1996 | Moshayedi | 439/638 |
| 5,608,607 A | | 3/1997 | Dittmer | 361/686 |
| 5,634,802 A | | 6/1997 | Kerklaan | 439/131 |
| 5,660,568 A | | 8/1997 | Moshayedi | 439/654 |
| 5,667,390 A | | 9/1997 | Keng | 439/76.1 |
| 5,679,013 A | | 10/1997 | Matsunaga et al. | 439/144 |
| 5,727,972 A | | 3/1998 | Aldous et al. | 439/655 |
| 5,773,332 A | | 6/1998 | Glad | 439/344 |

\* cited by examiner

US 6,561,824 B1

MEDIA CONNECTOR INTERFACE FOR ELECTRICAL APPARATUS

CROSS-REFERENCE TO RELATED APPLICATIONS

This application is a continuation of U.S. application Ser. No. 08/976,819 that was filed on Nov. 24, 1997 and now abandoned; which is a continuation-in-part of U.S. application Ser. No. 08/689,715 that was filed on Aug. 16, 1996 and is now U.S. Pat. No. 5,727,972; which is a continuation of U.S. application Ser. No. 08/291,277 that was filed on Aug. 16, 1994 and is now U.S. Pat. No. 5,547,401; which is a continuation-in-part of U.S. application Ser. No. 08/040,656 that was filed on Mar. 31, 1993 and is now U.S. Pat. No. 5,338,210; which is a continuation-in-part of U.S. application Ser. No. 07/974,253 that was filed on Nov. 10, 1992 and is now abandoned; which is a divisional of U.S. application Ser. No. 07/866,670 that was filed on Apr. 8, 1992 and is now U.S. Pat. No. 5,183,404. These related applications listed above are expressly incorporated by reference in their entireties.

BACKGROUND

1. Field of the Invention

The present invention relates to electrical interface connections. More particularly, it relates to electrical apparatus configured to couple with a physical/electrical media plug.

2. Description of Related Art

The field of data transmissions over phone lines or network cables is a rapidly expanding field. Users of electrical apparatus such as laptops, notebooks, palmtops, and PDAs are finding such practice to be of great value.

For example, there are numerous public and private networks and databases which store data or programs. Absent the ability to connect with such systems over the telephone lines, a user is relegated to relying upon the exchange of discs or tapes in order to receive data suitable for use with their computer.

Similarly, companies performing tasks that are integrated are aided by local area networks ("LANs") which permit personnel to exchange electronically retrievable data. The ability to freely transfer data and information from one computer to another computer over a telephone line or cable can dramatically increase productivity and reduce overall production time.

Furthermore, the increased use of palmtops and PDAs has increased the need to be able to transfer data between such apparatus and other computers, particularly personal computers. This enables a user to quickly transfer information, such as telephone or address list, without having to make manual entries.

The interface between a computer and a cable or telephone line is typically accomplished through a physical/ electrical media connector. One conventional type of media connector is the RJ-type connector. RJ-type connectors are used by almost all telephone companies throughout the world for many applications, the most important of which is interconnection of telephones with telephone lines. For this reason, stringent standardization of connectors has been established to enable compatibility and interactivity. Due to the simplicity of the connection and the established standards, RJ-type connectors are used extensively in the computer industries and in other industries where communication over telephone lines or other types of cables is required.

RJ-type connectors include a plug or contact block and a receptacle or socket. The plug comprises a small block coupled with a cable, such as a telephone line. Housed within the block are a plurality of distinct metal contacts. Each of the metal contacts are attached to a discrete wire within the cable. A plurality of thin slots extend from the end of the block to each of the contacts. Mounted on the outside of the block is a flexible retention arm.

The socket is integrally formed on the side of the electrical apparatus and is configured to receive the plug. Disposed within the socket are a plurality of flexible contact wires. The contact wires are oriented to be received within corresponding slots on the plug when the plug is slid into the socket. The contact wires within the socket press against corresponding contacts on the plug to complete electrical connection between the plug and the electrical apparatus. The interior surface of the socket also defines a catch that receives the retention arm on the plug so as to mechanically secure the plug within the socket. To remove the plug, the retention arm is manually flexed to release the catch, thereby enabling manual removal of the plug from the socket.

Although RJ type connectors are used extensively, they have several shortcomings. Most notably, the achievements in micro processing have enabled manufactures to dramatically downsize various electrical apparatus. For example, mobile telephones and PDA now exist that can easily fit in a shirt pocket. Such apparatus, however, are limited from further downsizing by the size of the socket in which the plug is received. That is, to enable an electrical apparatus to house a standard sized socket, the electrical apparatus must have at least the same thickness as the socket.

As computer housings have continued to be downsized, internal spatial restrictions have required the establishment of standards for the internal accessories of the computer. One set of standards applicable to memory cards has been developed by the Personal Computer Memory Card International Association (PCMCIA). This organization is comprised of hundreds of manufacturers of memory cards and related peripheral equipment. The PCMCIA has determined that the spatial standard for all memory cards used in down-sized computers should be restricted to a rectangular space approximately 55 mm in width, 85 mm in length, and 5 mm in depth.

In addition to the PCMCIA Standard, other standards are currently in development. Each proposal contains various specifications including device form factor and specific electrical characteristics. The specifications may include both computer peripherals as well as memory cards. One trend, however, common to many of these proposals is the trend to smaller, thinner peripheral cards.

In keeping with the standards for small memory and peripheral cards, internal modem manufacturers have adopted the same spatial standards for use with their down-sized communications cards. By complying with the standards for established and future cards, communications card manufacturers have assured themselves of compatibility and spatial conformity with computers utilizing the standards. These standards, current and future, are referred to herein as "thin-architecture" standards.

The constraints imposed by these standards have resulted in the development of "credit card" communications cards. Most of the components formerly housed within a modem are now contained within a credit card-sized wafer. One communications card conforming to the PCMCIA standard is produced by Intel under the ExCA☐trademark and is similar to that illustrated in FIG. 3.

Although the communications card illustrated serves the functions of a modem, a similar card has been contemplated for use in LANs.

Besides limiting the size of the electrical apparatus, the socket which is recessed within the electrical apparatus occupies valuable space. Even in larger apparatus it is desirable to optimize the use of space so as to minimize size. The space occupied by the socket is wasted when coupling with a plug is not required. Furthermore, the presence of a large open socket on an electrical apparatus distracts from the aesthetic appearance of the computer. The socket also acts as a sink to collect dirt and other debris.

OBJECTS AND BRIEF SUMMARY OF THE INVENTION

Accordingly, it is an object of the present invention to provide electrical apparatus that are capable of direct connection with a cable or wire through a media plug of a physical/electrical media connector.

Another object of the present invention is to provide electrical apparatus that are not limited in size by standard media plugs.

Yet another object of the present invention is to provide electrical apparatus that minimize the space that receives a standard media plug.

Finally, another object of the present invention is to provide electrical apparatus wherein the socket that receives the standard media plug can be selectively closed.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an aperture block is provided for coupling with a physical/electrical media plug. The aperture block is attached to an electrical apparatus, for example, a laptop, notebook, palmtop, PDA, pager, modem, or telephone. Non-conventional electrical apparatus can include televisions, stereo equipment, automobiles, and appliances.

The physical/electrical media plug (such as an RJ-11) comprises a small contact pin block coupled with a cable, such as a telephone line. Housed within the block are a plurality of distinct contacts pins. Each of the contacts pins are attached to a discrete wire within the cable. A plurality of thin slots extend from the end of the block to each of the contact pins. Mounted on the outside of the block is a flexible retention arm. The retention clip has several standardized characteristics, including a broad fixed end protruding from an outer surface of the contact pin block. The broad fixed end tapers abruptly at a transition notch and terminates at a narrow free end.

The aperture block can either be retractable within the electrical apparatus or, in an alternative embodiment, removable from the electrical apparatus. In the retractable embodiment, the aperture block is slidably disposed within the an opening formed in the casing of the electrical apparatus. The aperture block communicates with the internal circuitry of the electrical apparatus by way of flexible wire ribbon. The aperture block can be selectively moved between an extended position and a retracted position. In the extended position, the aperture block projects out from the casing to enable coupling with the media plug. When not in use, the aperture block can be moved to the retracted position by selectively pushed the aperture block into the opening in the casing.

In the removable embodiment, the aperture block has a thin plug end. A complementary receptacle is formed on the casing of the electrical apparatus to receive the plug end. This receptacle is significantly smaller than conventional sockets that are configured to receive a standard RJ-type plug. During use, the aperture block is selectively coupled to the receptacle. When not in use, the aperture block can be removed and stored out of the way.

In both the retractable and removable aperture blocks, an aperture is formed therein. The aperture is configured to receive the media plug. A plurality of contact wires project from the aperture block into the aperture. During use, the media plug is inserted into the aperture so that the contact wires are biased against the contact pins, thereby effecting electrical communication between the media plug and the electrical apparatus through the aperture block. This direct connection obviates the need for conventional adapters to facilitate connection of the media plug to the electrical apparatus.

One of the unique benefits of using the aperture block is that the aperture block can be constructed having a thickness significantly smaller than the thickness of the media plug. For example, by forming the aperture completely through the aperture block, the opposing ends of the media plug inserted therein can freely project from opposing sides of the aperture block. The aperture block need only be thick enough to structurally support the media plug and securely hold the contact wires. Accordingly, use of the aperture block enables the manufacture of thinner electrical apparatus and makes a more effective use of available space. The aperture block can also be either removed or retracted so as to be out of the way and so as to eliminate the presence of a large, closed end socket which can collect dirt.

The aperture block can be designed in a variety of alternative embodiments. For example, the aperture can be angled relative to the top surface of the aperture block. In this design, a ridge projecting from the aperture block can be used to prevent the passage of the media plug complete through the aperture. Alternatively, the aperture can be perpendicular to the top surface of the aperture block. In this embodiment, stirrups, diaphragms, face plates, or other retention structures can be attached to the aperture block to prevent the passage of the media plug complete through the aperture.

Means are also provided for securing the media plug within the aperture of the aperture block. One embodiment of such means comprises a broad retention clip groove formed in a wall of the aperture and being configured to receive the broad fixed end of the retention clip. The broad retention clip groove has a floor, walls, and a retention ridge formed in at least one of the walls of the broad retention clip groove. The retention ridge is capable of capturing the transition notch of the retention clip as tension produced between the biased retention clip and the opposing wall of the aperture urge the broad fixed end of the retention clip into the broad retention clip groove. Simultaneously, the transition notch is forced over the retention ridge by the tension between the connector pin block and an opposing wall of the aperture as the media plug is pushed into the aperture.

The angled orientation of the aperture allows the aperture to present a longer realized aspect relative to the media plug to allow capture of the transition notch therein. In alternate embodiments, stirrups of a variety of shapes can engage the transition notch of the retention clip to retain the media plug within the aperture.

One embodiment utilizes engaging tracks and channels to support the retractable aperture block within the casing and to facilitate easy movement therein. Other embodiments include springs to biasing the retractable aperture block out of the casing and levers for selectively retaining the retractable aperture block within the casing.

In yet other embodiment, the aperture can be replaced with a channel either recessed within the aperture block or formed adjacent to the aperture block by various support structures. Such channels are also configured to complementary receive a media plug in both electrical and mechanical engagement.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

The present invention relates to physical/electrical media connectors used to both physically and electrically connect a wire, such as a telephone wire or electrical cable, to an electrical apparatus. Preferred physical/electrical media connectors are those that contain the attributes described in F.C.C. Part 68, subpart F. The physical/electrical media connectors of the present invention, however, are not limited by the F.C.C. standards and may fall outside such standards as the need dictates or as the standards change.

Physical electrical media connectors as used herein include a physical/electrical media plug and an aperture block. Examples of conventional physical/electrical media plugs are the RJ-11, RJ-45, RJ-type, 6-pin miniature modular plug, and 8-pin miniature modular plug. The media plugs of the present invention are also intended to include nonstandard plugs and plugs that are developed or standardized in the future. The aperture blocks of the present invention are configured to electrically and mechanically receive a corresponding media plug. Although many of the depicted examples of inventive aperture blocks are configured to receive a single type of media plug, the present invention contemplates that it would be obvious to one skilled in the art based on the present disclosure to modify the depicted aperture blocks to receive any media plug configuration.

The term "electrical apparatus" as used in the specification and appended claims is broadly intended to include any apparatus having electrical components. By way of example and not limitation, some of the more conventional electrical apparatus include: network computers, laptop computers, personal computers, notebook computers, palm top computers, PDA's, telephones, modems, televisions, stereos, pagers, electrical tools, electrical appliances, and automobiles. The function that the corresponding media connector serves may be vastly different depending on the type of electrical apparatus. For example, the media connector may be used for transferring data or diagnostic testing.

Figure 1:
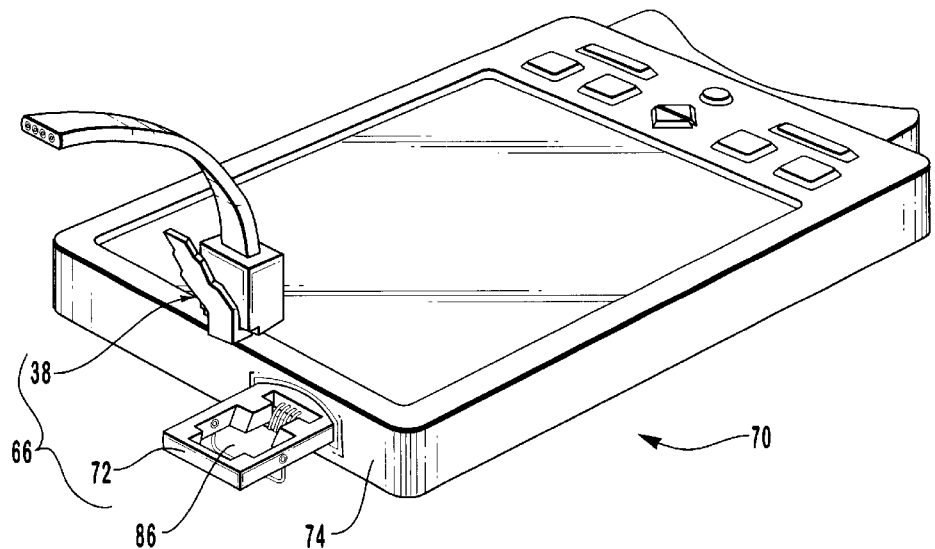
FIG. 1 is a perspective view of one embodiment of a retractable aperture block mounted to an electrical apparatus.

Depicted in FIG. 1 is an electrical apparatus 70 comprising a PDA having a casing 74. Projecting from casing 74 is one embodiment of an inventive aperture block 72 incorporating features of the present invention. Aperture block 72 is retractable into casing 74 and is in electrical communication with the internal circuitry of electrical apparatus 70. Extending through aperture block 72 is an aperture 86. Aperture 86 is configured to receive a physical/electrical media plug 38 so as to facilitate electrical communication between media plug 38 and electrical apparatus 70. Media plug 38 and aperture block 72 jointly define a physical/electrical media connector 60.

Figure 2:
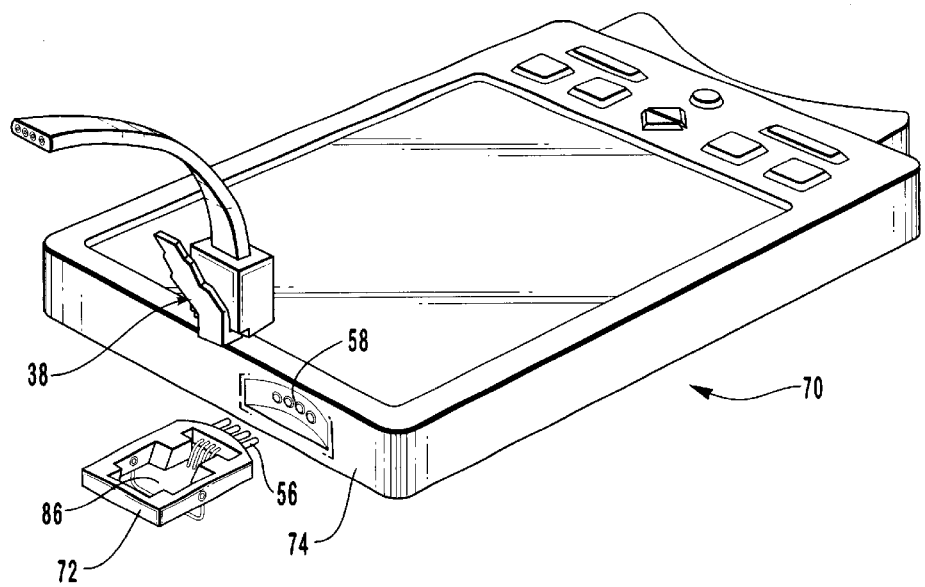
FIG. 2 is a perspective view of one embodiment of a detachable aperture block mounted to an electrical apparatus.

FIG. 2 illustrates electrical apparatus 70 having casing 74 with a receptacle 58 formed thereon. In this embodiment, aperture block 72 has a plug end 56 configured to be selectively received within receptacle 58. As a result, aperture block 72 can be selectively detachable from casing 74. This is another general system for achieving electrical communication between media plug 38 and electrical apparatus 70. Detachable aperture block 72 is in electrical connection with electrical apparatus 70 when attached. As used in this application, the term "aperture block" refers to either an aperture block that is retractable as depicted in FIG. 1, or an aperture block that is detachable as depicted in FIG. 2. In the absence of any specific designation, the term aperture block should be construed throughout this application to include either or both retractable and detachable functions.

Figure 3:
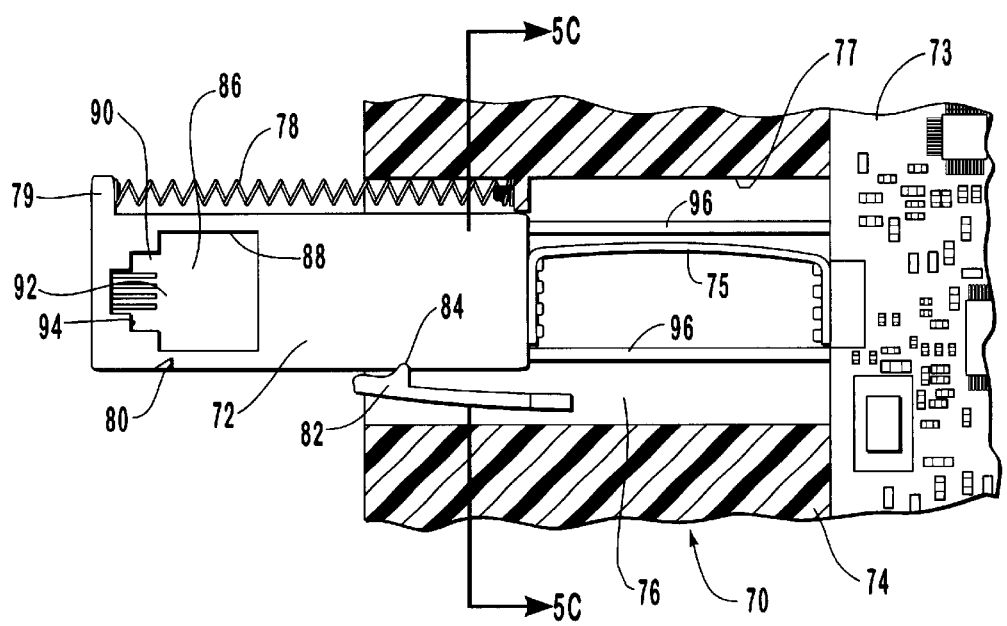
FIG. 3 is a top plan view of an alternative embodiment of a retractable aperture block in an extended position.

FIG. 3 shows an enlargement of one embodiment where aperture block 72 is retractable into casing 74. Housed within casing 74 is electrical circuitry 73 such as a circuit board. Retractable aperture block 72 slides in and out of a slot 76 formed within casing 74. Slot 76 is bounded by an interior surface 77.

According to one aspect of the present invention, means are provided for maintaining electrical communication between retractable aperture block 72 and electrical apparatus 60 as retractable aperture block 72 travels in and out of casing 74. By way of example and not limitation, the electrical communication maintenance means of the embodiment illustrated in FIG. 3 comprise a flexible wire ribbon 75. Flexible wire ribbon 75 is connected at one end both physically and electrically to electrical circuitry 73. The other end of flexible wire ribbon 75 is connected both physically and electrically to aperture block 72.

According to one aspect of the present invention, biasing means are provided for biasing retractable aperture block 72 of casing 74 in a direction external to electrical apparatus 70. By way of example and not limitation, the biasing means of the embodiment illustrated in FIG. 3 comprise a spring 78 and at least one spring ramp 79.

According to another aspect of the present invention, means are provided for selectively retaining retractable aperture block 72 within casing 74. By way of example and not limitation, the selective retention means of the embodiment illustrated in FIG. 3 comprise a retention notch 80 in combination with a biased lever 82. When a user no longer wishes access to aperture block 72, the user merely presses retractable aperture block 72 back within the confines of slot 76. Biased lever 82 engages retention notch 80, thereby preventing inadvertent exposure of retractable aperture block 72 outside of casing 74.

According to still another aspect of the present invention, means are provided for restricting the travel of retractable aperture block 72 to a predetermined distance outside of casing 74. By way of example and not limitation, the travel restricting means of the embodiment illustrated in FIG. 3 comprise biased lever 82 engaging limiting notch 84. Biased lever 82 serves as an actuating mechanism to initiate exposure or retraction of retractable aperture block 72. A guide track 96 is formed within casing 74 and protrudes upwardly from interior surface 77 into slot 76. Guide track 96 is inter-engaged with a corresponding guide groove formed in the bottom of retractable aperture block 72.

Aperture 86 having a plurality of walls 88 is formed within retractable aperture block 72. Aperture 86 is so sized and shaped as to be capable of receiving a physical/electrical media plug. Within aperture 86 is formed a broad retention clip groove 90, a narrow retention clip groove 92, and a retention ridge 94. The structures within aperture 86 provide for the retention of a connector pin block of a physical/electrical media plug.

When a user wishes to connect a telephone line or other cable to electrical apparatus 70, biased lever 82 is manipulated out of retention notch 80. As retractable aperture block 72 is released from the grip of biased lever 82, tension applied by spring 78 urges retractable aperture block 72 out of slot 76. The progress of retractable aperture block 72 is guided by guide track 96 and is halted when biased lever 82 engages limiting notch 84. A user then inserts a physical/electrical media plug into aperture 86 to provide an electrical connection between the physical/electrical media plug and electrical apparatus 70.

After use, the physical/electrical media plug is removed from aperture 86, and biased lever 82 is removed from limiting notch 84. Pressure opposing spring 78 is then applied until biased lever 82 engages retention notch 80. Engagement of biased lever 82 into retention notch 80 secures aperture block 72 within casing 74, thereby protecting aperture block 72 from breakage during transport of electrical apparatus 70.

Figure 4:
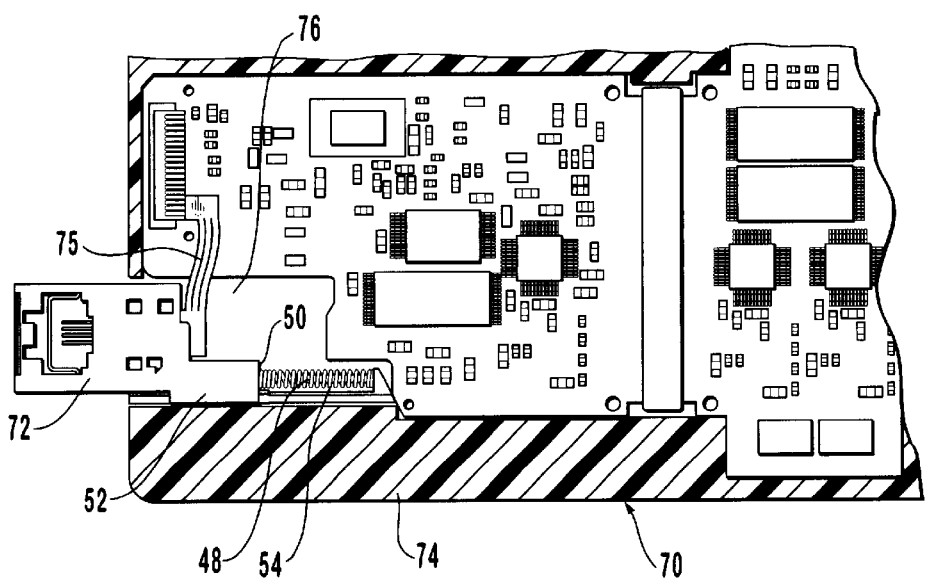
FIG. 4 is a top plan view of another alternative embodiment of a retractable aperture block in an extended position.

Depicted in FIG. 4 is an alternative embodiment of an aperture block 72 being selectively retractable within casing 74 of electrical apparatus 70. As depicted therein, projecting from the interior surface of casing 74 is a post 54. Post 54 projects towards the opening of slot 74. Extending from aperture block 72 in alignment with post 54 is a spring housing 52 having an aperture 50 recessed therein. A spring 48 has a first end received over post 54 and opposing second end received within aperture 50. As a result, spring 48 functions to bias retractable aperture block 72 in a direction external to aperture block 72, thereby functioning as an alternative to the biasing means previously described.

Figure 5A:
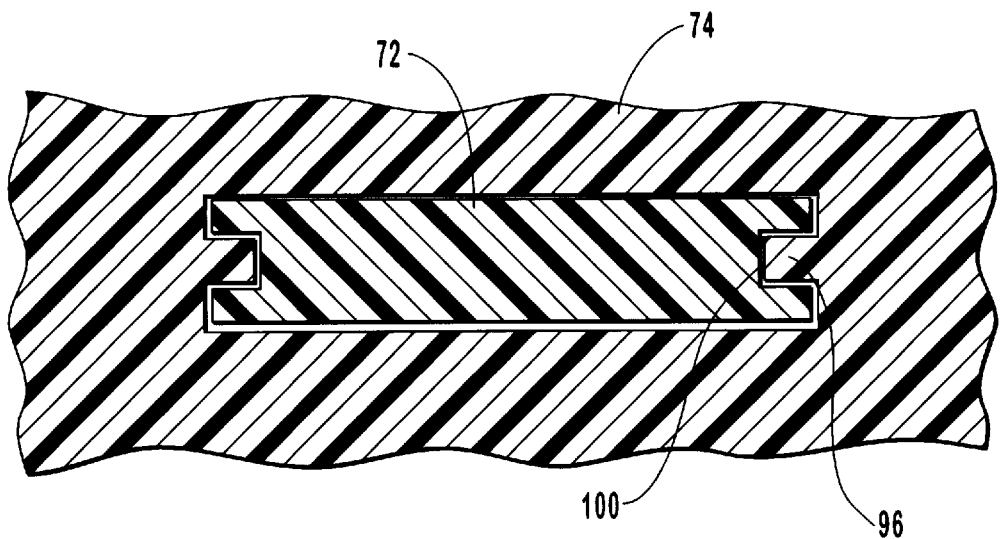
FIG. 5A is a cross-sectional front view of a retractable aperture block mounted within the electrical apparatus of FIG. 1.
Figure 5B:
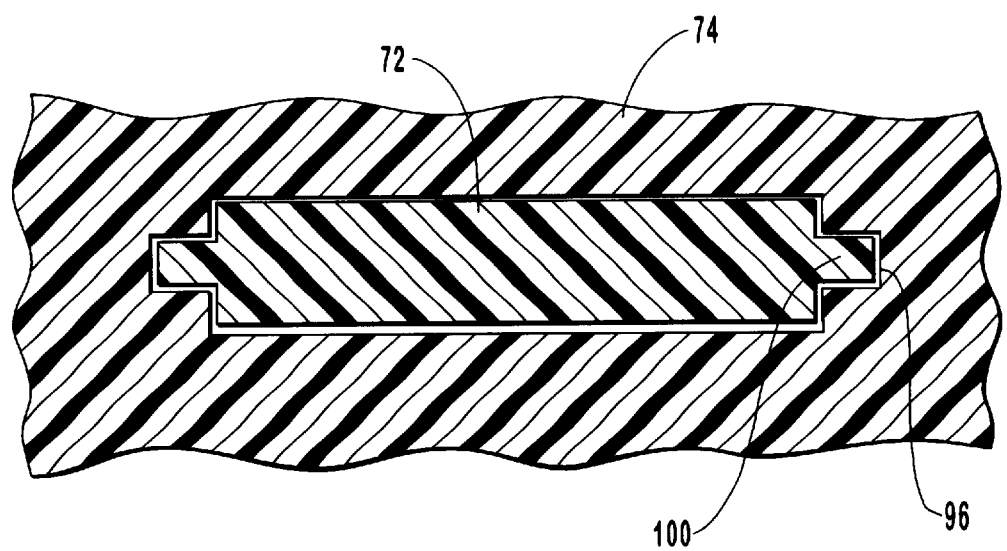
FIG. 5B is a cross-sectional front view of an alternative embodiment of a retractable aperture block such as that illustrated in FIG. 5A also mounted in an electrical apparatus.

According to one aspect of the present invention, means are provided for guiding the travel of retractable aperture block 72 in and out of casing 74. By way of example and not limitation, the guiding means of the embodiments illustrated in FIGS. 5A–5C comprise guide channel 100 and guide track 96. FIG. 5A illustrates retractable aperture block 72 interengaged with casing 74 through the interaction of guide track 96 with guide channel 100. FIG. 5B illustrates an alternate embodiment of the guiding means illustrated in 5A, wherein the guide track 96 and guide channel 100 are reversed such that guide track 96 is formed on aperture block 72 and guide channel 100 is formed in casing 74.

Figure 5C:
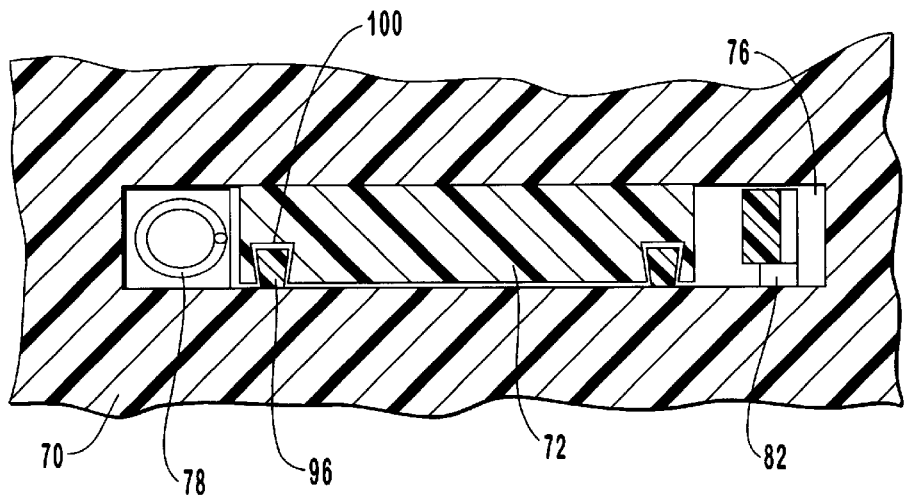
FIG. 5C is a cross-sectional front view of the aperture block taken along lines 5C—5C in FIG. 3.

FIG. 5C is a cross-sectional view taken along lines 5C—5C of FIG. 3 illustrating the interaction of retractable aperture block 72 with casing 74. Retractable aperture block 72 is shown having guide channel 100 through which guide track 96 slides when aperture block 72 is urged out of slot 76 by spring 78. Guide track 96 is formed on the bottom of electrical apparatus 70 protruding upward whereas guide channel 100 is formed in the bottom of retractable aperture block 72.

Figure 6:
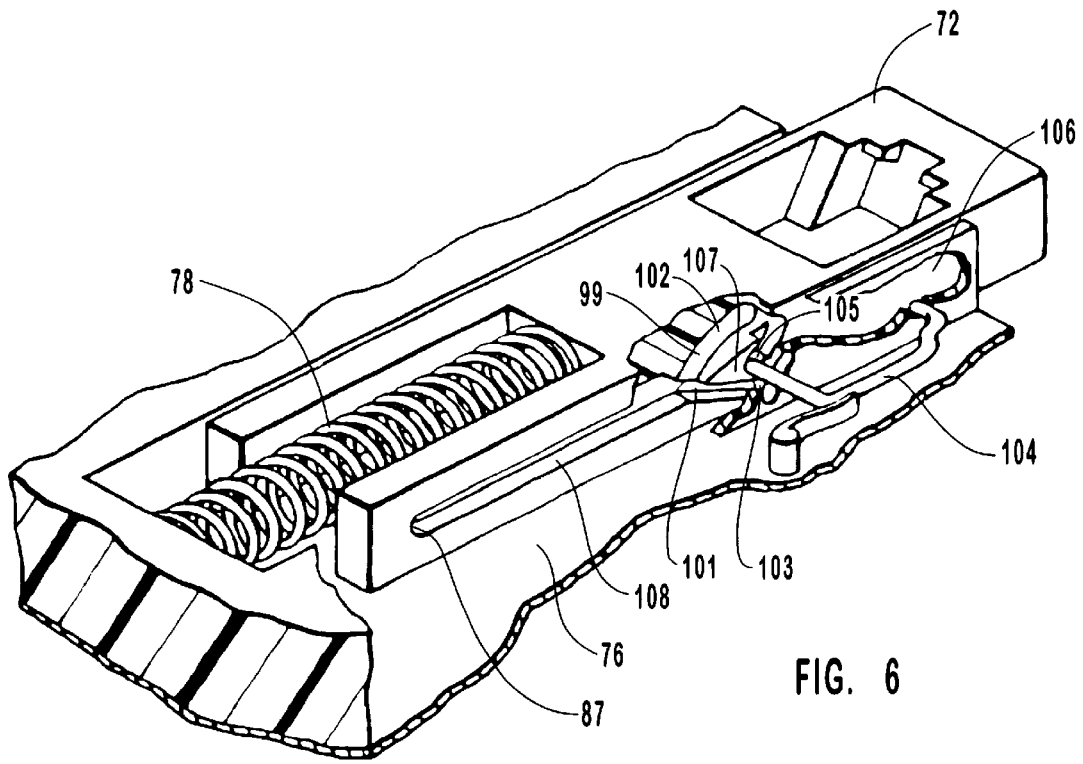
FIG. 6 is a partially cut away perspective view of a retractable aperture block having an actuating shaft biased within a pathway thereon.

FIG. 6 illustrates an alternate embodiment of the present invention. Depicted therein, a linear extended pathway 108 is recessed within the side of aperture block 72. A chevron-shaped ratcheted groove 102 is formed at one end of pathway 108. Disposed within groove 102 is an actuating shaft 104. Indentations or steps formed within groove 102 impart a ratcheting action preventing movement of actuating shaft 104 in a retrograde or counter-clockwise motion. As retractable aperture block 72 is advanced into slot 76, actuating shaft 104 travels along pathway 108 to ratcheted groove 102. Within ratcheted groove 102, actuating shaft 104 travels up a first ramp 101 and then drops into a first step 103. As retractable aperture block 72 is released, actuating shaft 104 drops into a second step 105 and is biased against a brace 107.

The contact between actuating shaft 104 and brace 107 prevents retractable aperture block 72, which is continually urged by spring 78, from automatically advancing out of slot 76. To extend retractable aperture block 72 from slot 76, retractable aperture block 72 is pushed slightly into slot 76 causing actuating shaft 104 to drop onto a descending ramp 99. As retractable aperture block 72 is released, actuating shaft 104 slides over descending ramp 99 and back into pathway 108, thereby allowing retractable access portion 26 to freely slide outward until actuating shaft 104 biases against an end 87 of pathway 108. Further travel of retractable aperture block 72 is halted by contact between actuating shaft 104 and end 87 of linear extended pathway 108. The above process can be repeated to selectively move retractable aperture block 72 between the projected position and retracted position. Ratcheted groove 102, actuating shaft 104, and brace 107, comprise an alternative embodiment of the selective retaining means previously discussed. Likewise, actuating shaft 104 and end 87 of pathway 108 comprise an alternative embodiment of the previously discussed restricting means.

Figure 7:
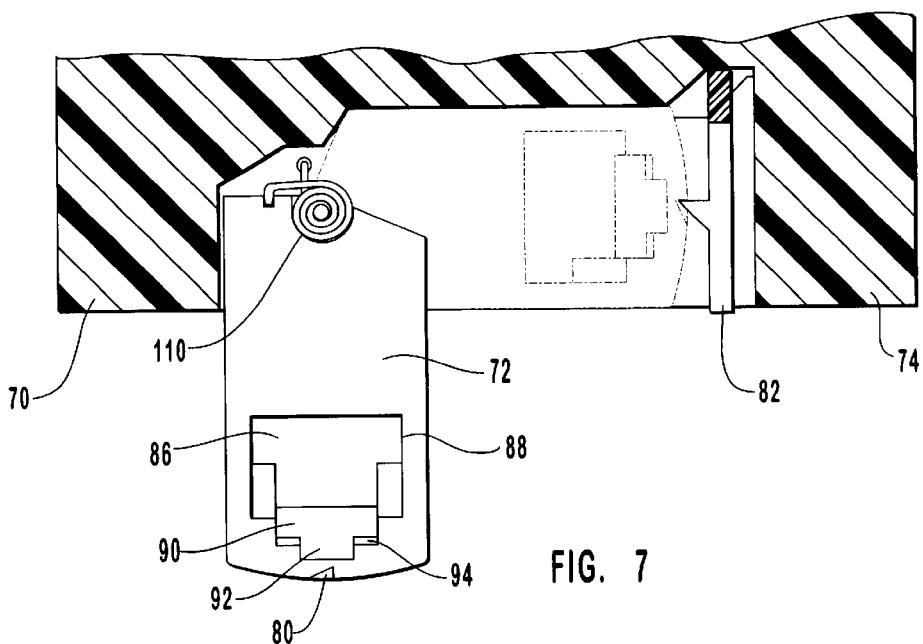
FIG. 7 is a top plan view of an aperture block configured for rotational retraction out of an electrical apparatus.

FIG. 7 illustrates an alternate embodiment of aperture block 72 employing the teachings of the present invention. As depicted therein, retractable aperture block 72 is rotatably biased outside of casing 74 using a sprung wire 110. Sprung wire 110 comprises an alternative embodiment of the biasing means for biasing retractable aperture block 72 of casing 74 in a direction external to electrical apparatus 70. When a user no longer wishes access to retractable aperture block 72, the user merely rotatably presses aperture block 72 back within casing 74 such that retention notch 80 is engaged by biased lever 82, thereby preventing inadvertent exposure of retractable aperture block 72. Retention notch 80 and biased lever 82 comprises an alternative embodiment to the selective retaining means previously discussed.

Figure 8:
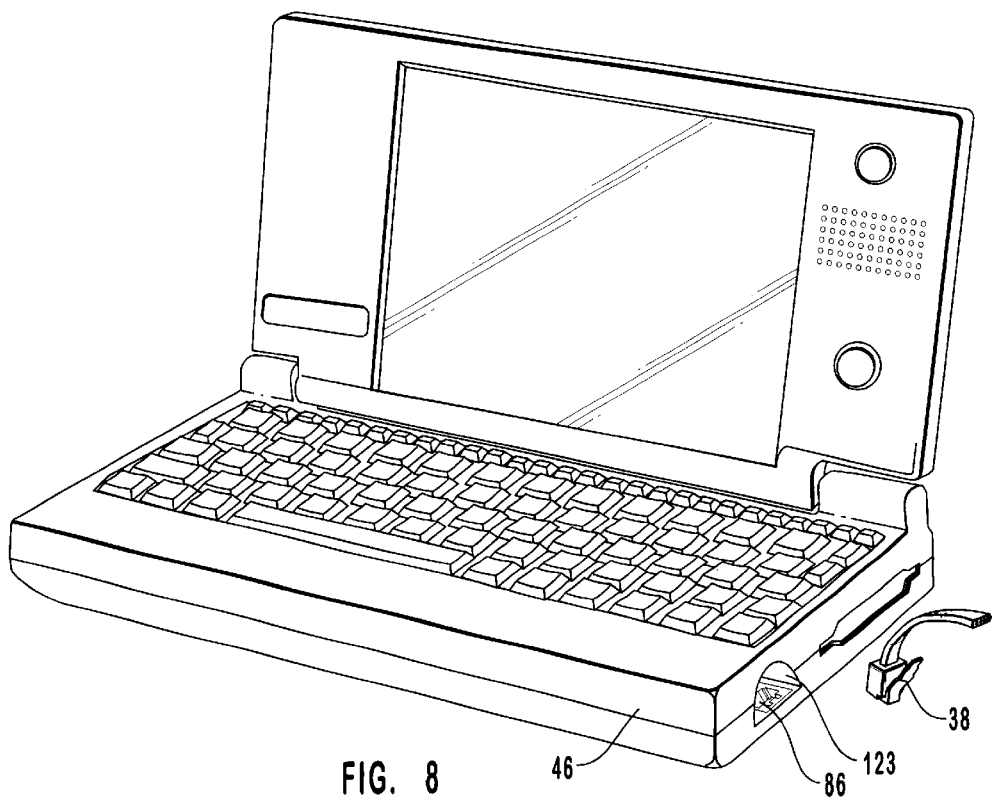
FIG. 8 is a perspective view of a palm top computer having an opening extending to an aperture disposed therein.

FIG. 8 depicts an alternative electrical apparatus 46 comprising a palm top having formed therein an access tunnel 123. Access tunnel 123 allows direct access to an aperture 86 from outside of electrical apparatus 46. Media plug 38 is inserted through access tunnel 123 directly into aperture 86 to provide a physical and electrical connection between the media plug 38 and electrical apparatus 70.

Figure 9:
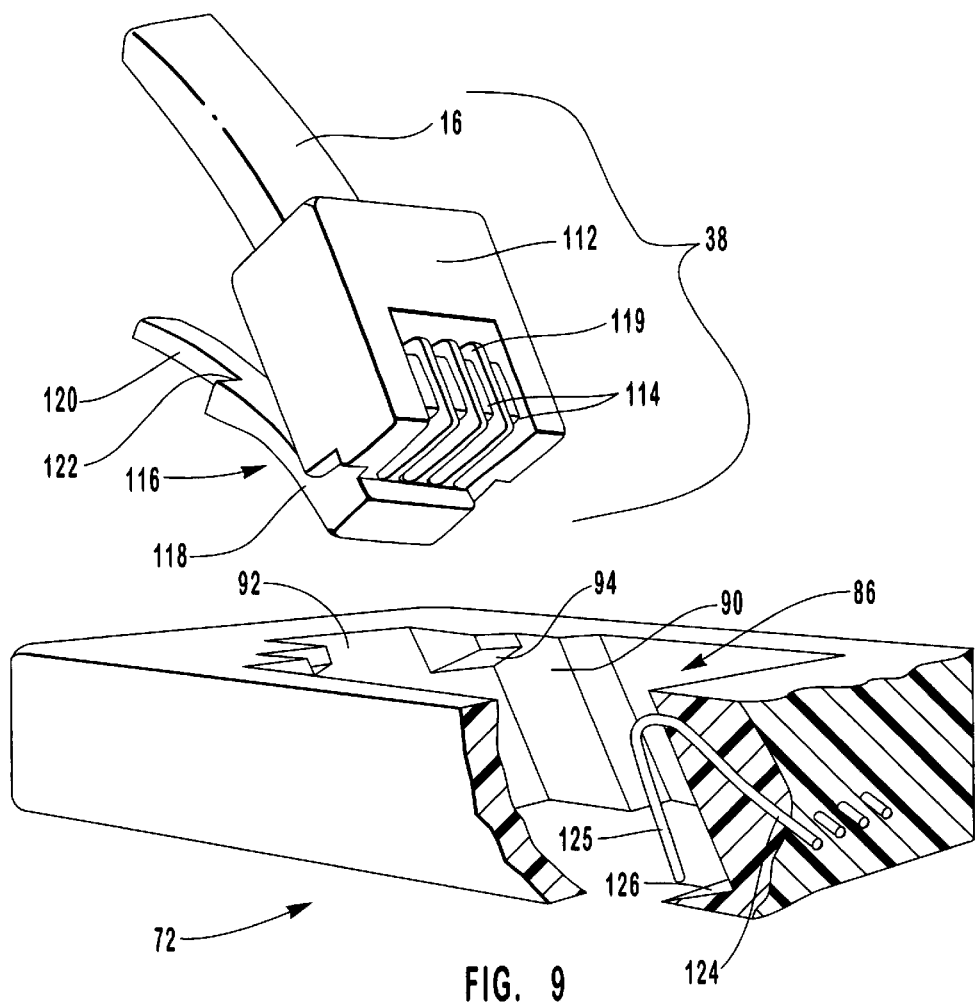
FIG. 9 is a partially broken away perspective view of an alternative aperture block having a sloped aperture configured to receive a physical/electrical media plug.
Figure 10:
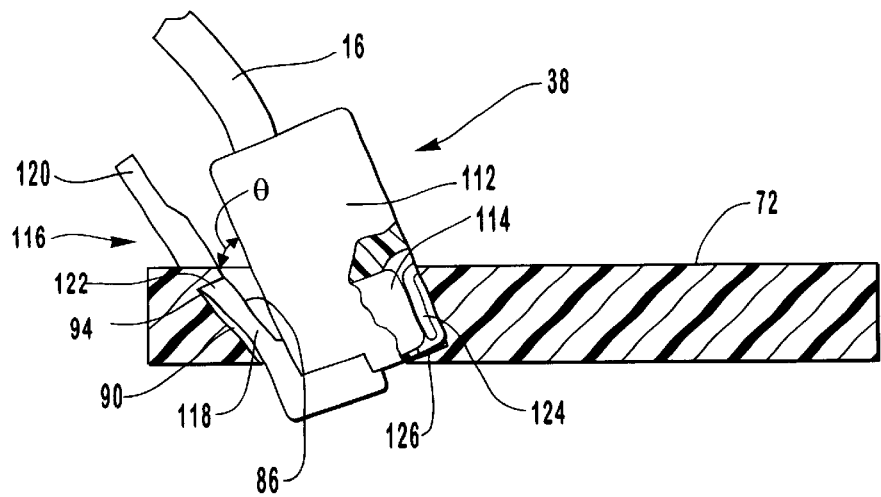
FIG. 10 is a partially broken-away cross-sectional side view of the aperture block and media plug shown in FIG. 9.

FIGS. 9 and 10 depict an inventive interface between a physical/electrical media plug 38 and aperture block 72. Aperture block 72 may be retractable or detachable, or may be formed within electrical apparatus 70 itself.

The present invention also includes coupling means for electronically coupling media plug 38 with aperture block 72. By way of example and not by limitation, depicted in FIGS. 9 and 10, aperture block 72 includes aperture 86. Aperture 86 has an interior surface configured complementary to the transverse cross section of media plug 38, thereby enabling media plug 38 to be received within aperture 86 as depicted in FIG. 10.

Media plug 38 comprises a plurality of discrete contact pins 114 disposed within a contact pin block 112. Each contact pin 114 is electrically coupled to a corresponding wire within cable 16. A plurality of slots 119 extend through the end of contact pin block 112 to communicate with a corresponding contact pin 114. Disposed within aperture block 72 are a plurality of contact wires 124. Each contact wire 124 has a first end 125 projecting into aperture 86. When media plug 38 is received within aperture 86, first end 125 of each contact wire 124 is received within a corresponding slot 119 in media plug 38 so as to bias against a contact pin 114, thereby effecting an electrical connection therebetween.

The present invention also includes means for preventing passage of contact pin block 112 completely through aperture 86 in aperture block 72. By way of example and not limitation, the passage prevention means of the embodiment illustrated in FIGS. 9 and 10 comprise a ledge 126 projecting into aperture 86. Ledge 126 is particularly effective in the embodiment depicted in FIGS. 9 and 10 since aperture 86 is sloped within aperture block 72 at an angle θ less than 90° relative to the top surface of aperture block 72. By sloping aperture 86, the volume of aperture 86 bounded within aperture block 72 is increased. As a result, there is more room and surface area for mechanically and electrically coupling media plug 38 to aperture block 72.

In one embodiment of the present invention, means are also provided for mechanically securing media plug 38 within aperture 86 of aperture block 72. By way of example and not by limitation, depicted in FIGS. 9 and 10 aperture 86 includes a broad retention clip groove 90, a narrow retention clip groove 92, and a thin retention ridge 94 projecting on each side of narrow retention clip groove 92. Mounted to the side of contact pin block 112 is a biased retention clip 116. Retention clip 116 comprises a broad fixed end 118, a narrow free end 120, and a transition notch 122 positioned therebetween. As media plug 38 is advanced within aperture 86, retention clip 116 flexes to slide against retention ridges 94. Once transition notches 122 pass by retention ridges 94, retention clip 116 resiliently flexes outward so as to mechanically lock transition notches 122 under retention ridges 94 as depicted in FIG. 10. In this configuration, media plug 38 is mechanically secured within aperture 86. To remove media plug 38 from aperture 86, retention clip 116 is compressed against contact pin block 112, thereby removing transition notches 122 from under retention ridges 94.

Figure 11:
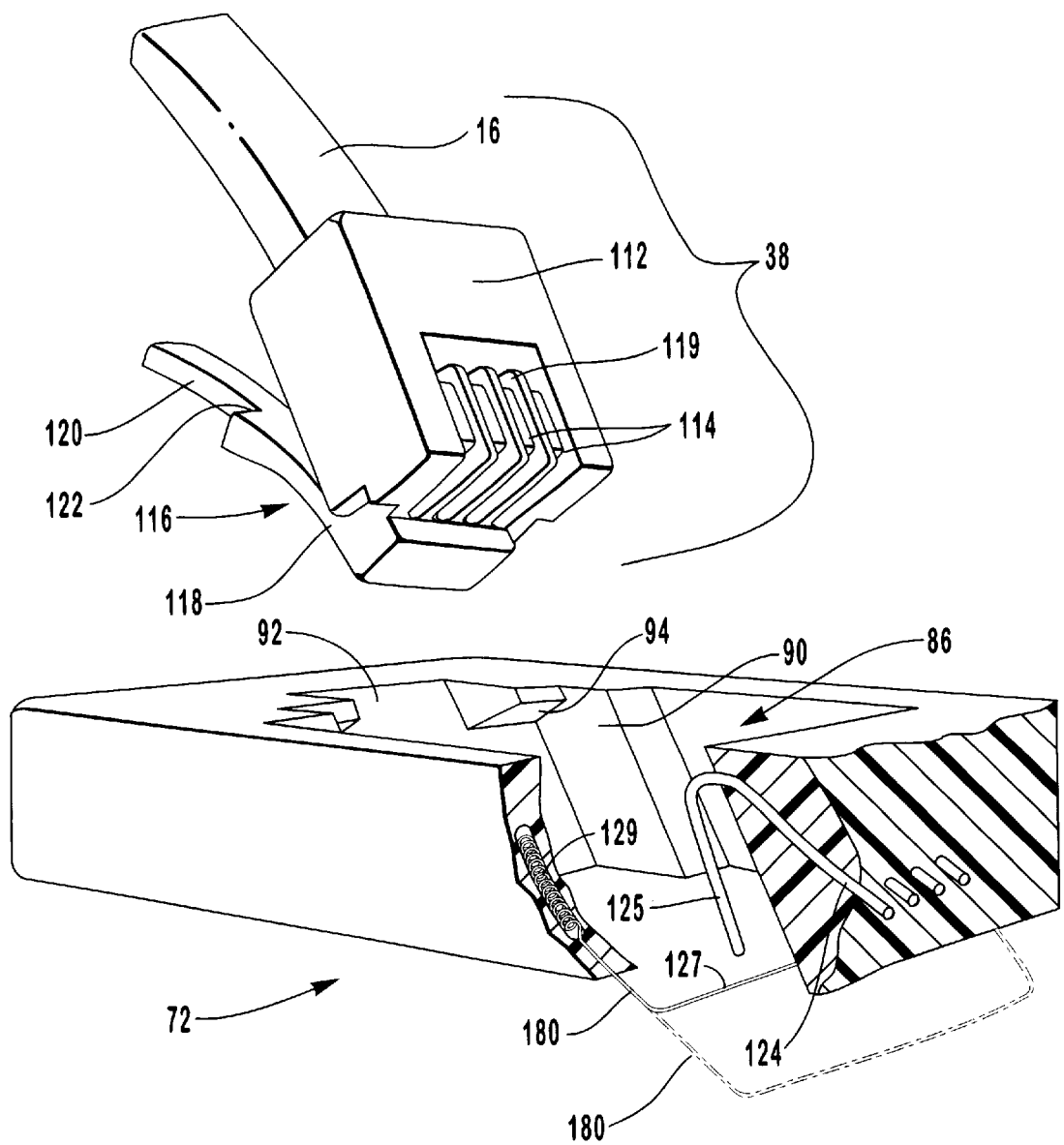
FIG. 11 is a partially broken away perspective view of an alternative embodiment of the aperture block shown in FIG. 9 with a spring mounted retention structure.

FIG. 11 illustrates another embodiment incorporating the teachings of the present invention. The embodiment illustrated in FIG. 11 also employs an angled aperture 86. In this embodiment, physical/electrical media plug 38 is inserted into the angled aperture 86. Mounted to aperture block 72 is a retention structure 180. Retention structure 180 includes a U-shaped wire 127 extending across aperture 86. A pair of spring 129 connects each end of U-shaped wire 127 to aperture block 72. The phantom lines of retention structure 180 show the position of retention structure 180 when a physical/electrical media plug 38 is inserted into aperture 86. The solid lines illustrate the normal state of repose of retention structure 180. In this configuration, retention structure 180 exerts a force opposing the insertion of the physical/electrical media plug 38.

Retention structure 180 serves a dual function. In one sense, retention structure 180 serves to prevent the physical/electrical media plug 38 from passing completely through aperture 86. Thus, the retention structure serves as an example of one embodiment of the means for preventing the passage of physical/electrical media plug 38 completely through aperture 86. In another sense, retention structure 180 opposes the insertion of media plug 38. The retention structure thus serves to ensure that biased retention clip 116 is retained in retention ridge 94 and at least one contact pin 114 is electrically connection to at least one contact wire 124.

Figure 12:
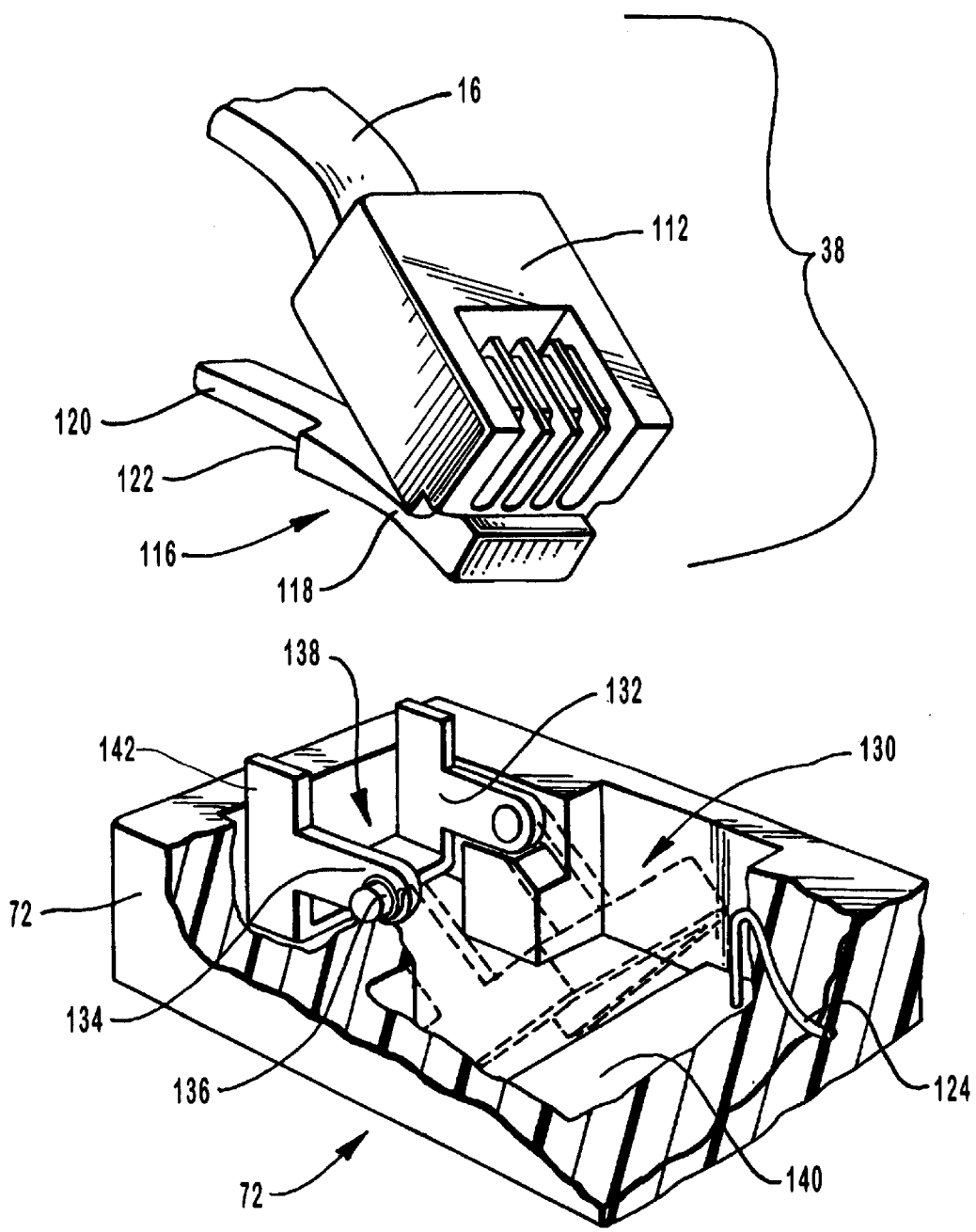
FIG. 12 is a partially broken-away perspective view of another alternative embodiment of an aperture block having a rotatable stirrup.

FIG. 12 illustrates yet another embodiment of the present invention. The embodiment illustrated in FIG. 12 does not employ an angled aperture, but instead utilizes a perpendicular aperture 130 formed within aperture block 72 of communications card 40. Such an arrangement requires that additional structures be incorporated to either capture retention clip 116 as the clip protrudes above the surface of aperture block 72 or to support the lower end of pin block 112 if it protrudes below the surface of aperture block 72.

Depicted in FIG. 12 is an alternative embodiment of the means for securing physical/electrical plug 38 within aperture 130 of aperture block 72. By way of example and not limitation, the securing means of the embodiment illustrated in FIG. 12 comprises a biased retention stirrup 132. Stirrup 132 is pivotally biased by a stirrup spring 134 about the longitudinal axis of a pivot pin 136. Stirrup spring 134 biases stirrup 132 by way of example in a clockwise direction in the embodiment illustrated in FIG. 12. The natural state of repose for stirrup 132 is shown in phantom lines.

When use of perpendicular aperture 130 is desired, stirrup 132 is pivoted out of aperture 130 into a recess 138, thereby removing any obstruction to media plug 38 as media plug 38 is inserted into aperture 130. In the embodiment illustrated in FIG. 12, travel of media plug 38 through aperture 130 is limited by a stop 140 which protrudes into aperture 130. Upon abutment of media plug 38 with stop 140, stirrup 132 may be released to pivot under urging from spring 134 into contact with the portion of media plug 38 protruding from the upper surface of aperture block 72. Stirrup 132 is configured so as to have a retention tab 142 projecting from stirrup 132 so as to be capable of engaging transition notch 122 when media plug 38 is abutting stop 140 in aperture 130. Spring 134 maintains engagement of retention tabs 142 with transition notch 122 when connection is made between media plug 38 and aperture 130.

Figure 13:
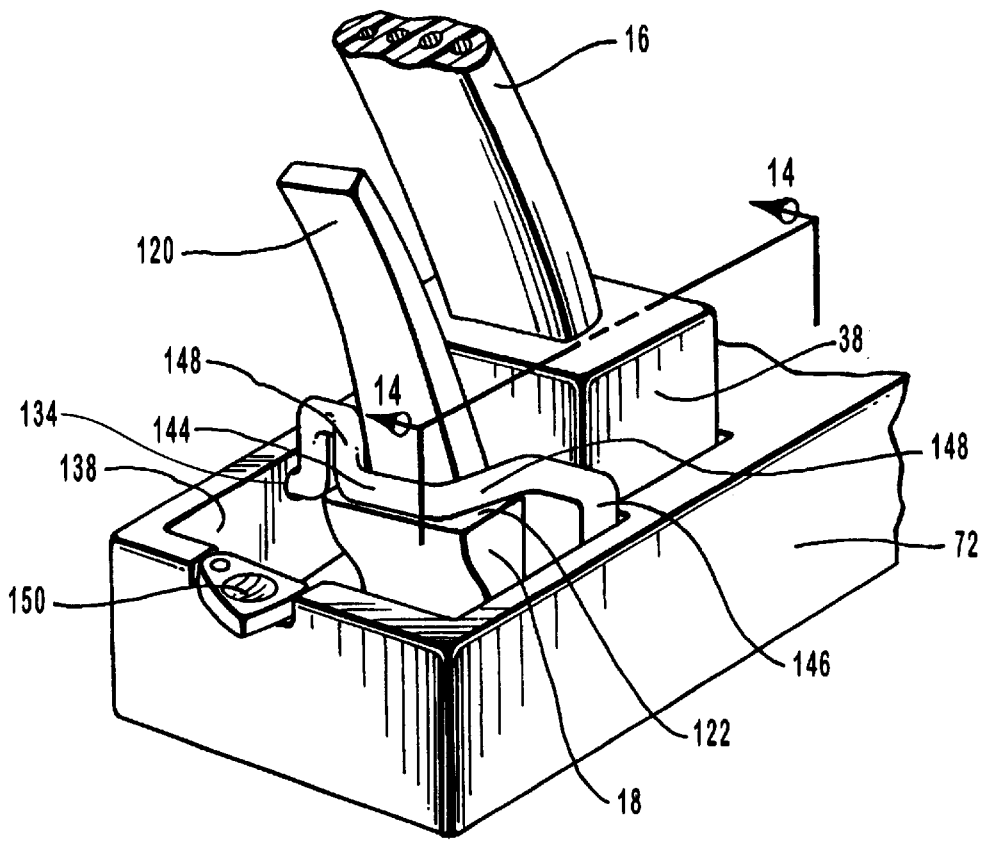
FIG. 13 is a perspective view of a physical/electrical media plug received within an alternative embodiment of an aperture block.

FIG. 13 also depicts an alternative embodiment of the means for mechanically securing physical/electrical plug 38 within aperture 130 of aperture block 72. By way of example and not limitation, the securing means of the embodiment illustrated in FIG. 13 comprise a biased biarcuate stirrup 144. Biarcuate stirrup 144 is pivotally biased against media plug 38. Retention of media plug 38 with aperture 130 is accomplished through the biarcuate shape of biarcuate stirrup 144.

As used in this specification, the term "biarcuate" describes any stirrup having depending attachment legs 146 and a retention leg 148 wherein the attachment legs are positioned apart at a distance at least as wide as broad fixed end 118 of raised retention clip 116 and the retention leg is capable of engaging transition notch 122 of raised retention clip 116.

As illustrated in FIG. 13, when biarcuate stirrup 144 is pressed into recess 138, tension produced by stirrup spring 134 urges biarcuate stirrup 144 into aperture 130. While biarcuate stirrup 144 may be manipulated out of aperture 130 prior to use, it is preferable to have biarcuate stirrup housed so as not to block entry of media plug 38 into aperture 130.

According to one aspect of the present invention, means are provided for selectively restraining stirrup 144 from obstructing aperture 130. By way of example and not limitation, the restraining means illustrated in FIG. 13 comprise a hinged locking disk 150. Locking disk 150 selectively engages biarcuate stirrup 144 to prevent pivoting of biarcuate stirrup 144 into aperture 130.

Figure 14:
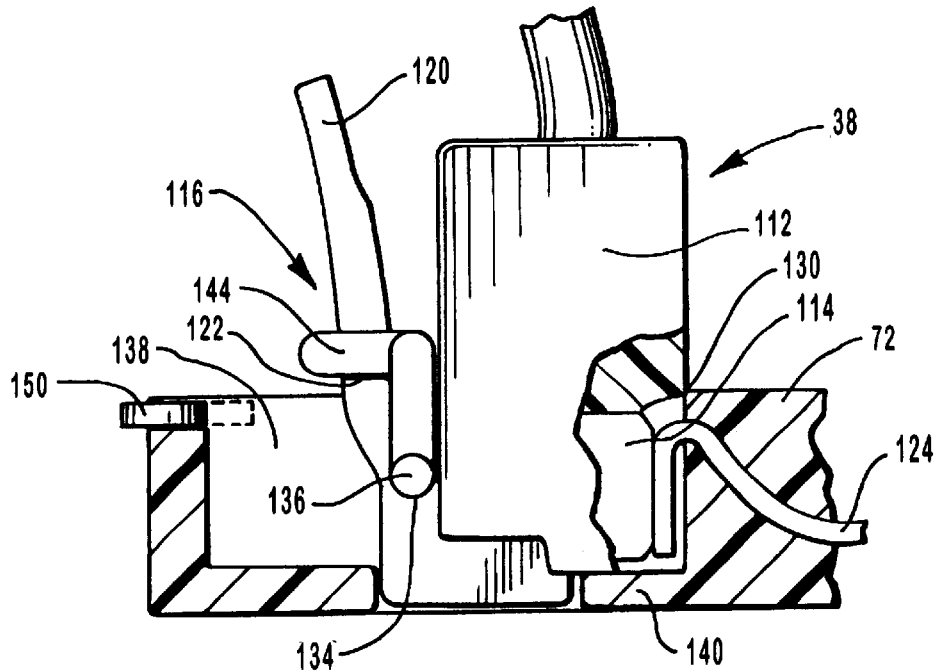
FIG. 14 is a cross-sectional side view of the aperture block and plug shown in FIG. 13 taken along lines 14—14.

FIG. 14 is a cross-sectional view taken along lines 14—14 in FIG. 13 illustrating more specifically the interaction between aperture 130 and media plug 38. Biarcuate stirrup 144 is shown engaged with transition notch 122 of biased retention clip 116. Tension produced between biased retention clip 116 and stirrup spring 134 via biarcuate stirrup 144 maintains the engagement of biarcuate stirrup 144 with transition notch 122. When media plug 38 is to be withdrawn from aperture 130, a user disengages biarcuate stirrup 144 from transition notch 122 by pressing biarcuate stirrup 144 into recess 138. Media plug 38 can then be freely withdrawn from aperture 130. When media plug 38 is not within aperture 130, biarcuate stirrup 144 is biased by stirrup spring 134 into aperture 130 unless otherwise biased open by locking disk 150. That is, locking disk 150 selectively engages biarcuate stirrup 144 to prevent pivoting of biarcuate stirrup 144 into aperture 130.

FIG. 14 also depicts that each contact wire 124 positioned within aperture block 72 biases against a corresponding contact pin 114 located in contact pin block 112 when contact pin block 112 is received within aperture 130.

Figure 15:
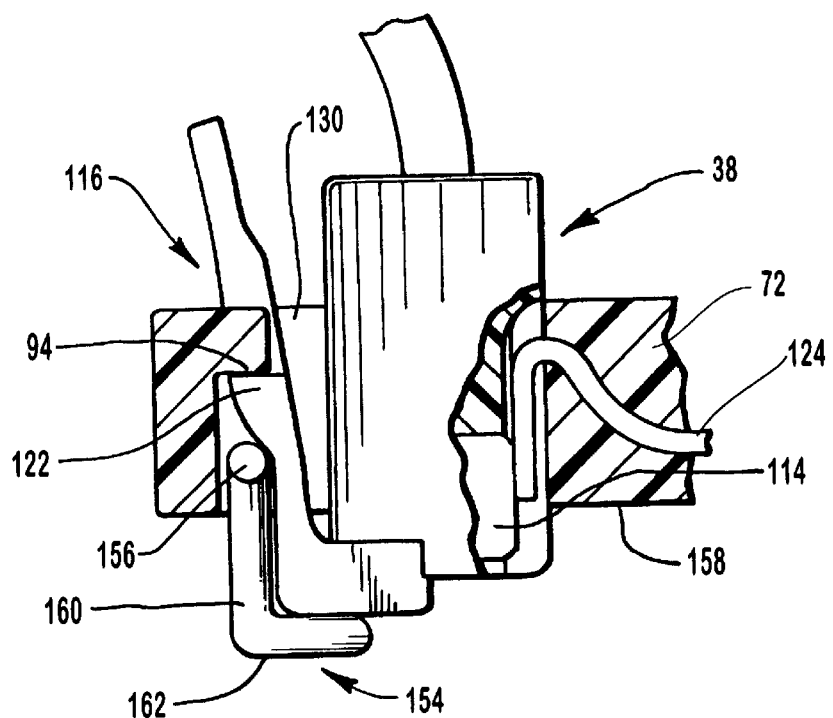
FIG. 15 is a cross-sectional side view of an alternative embodiment of an aperture block receiving a media plug.

FIG. 15 illustrates an aperture block 72 having a perpendicular aperture 130 formed therein. The embodiment of the present invention illustrated in FIG. 15 differs from that in FIG. 14 in that media plug 38 is not stopped by a protrusion from the wall of aperture 130, but is instead allowed to pass partially through aperture block 72. Partial passage of media plug 38 through aperture block 72 allows transition notch 122 of biased retention clip 116 to be selectively captured under retention ridges 94 of aperture 130 as previously discussed with regard to FIGS. 9 and 10.

FIG. 15 also depicts an alternative embodiment of the means for preventing passage of media plug 38 completely through aperture 130. By way of example and not limitation, the passage prevention means of the embodiment illustrated in FIG. 16 comprise a pivot arm 154. Pivot arm 154 is biased into aperture 130 by a pivot arm spring 156.

As media plug 38 is introduced into aperture 130, media plug 38 forces pivot arm 154 out of aperture 130 into a position below and perpendicular to a lower face 158 of aperture block 72. In this perpendicular position illustrated in FIG. 15, a depending arm 160 of pivot arm 154 is perpendicular to face 158. An abutment arm 162 protrudes perpendicular to depending arm 160. As pivot arm 154 is pressed out of aperture 130 by media plug 38, the progress of media plug 38 is halted upon abutment with abutment arm 162. At the point of abutment, transition notch 122 is engaged by retention ridge 94, thereby securing media plug 38 in aperture 130. Electrical contact between the plurality of contact pins 114 and contact wires 124 also occurs at this point. To remove media plug 38 from aperture 130, a user presses biased retention clip 116 against contact pin block 112 and pulls media plug 38 out of aperture 130.

Figure 16:
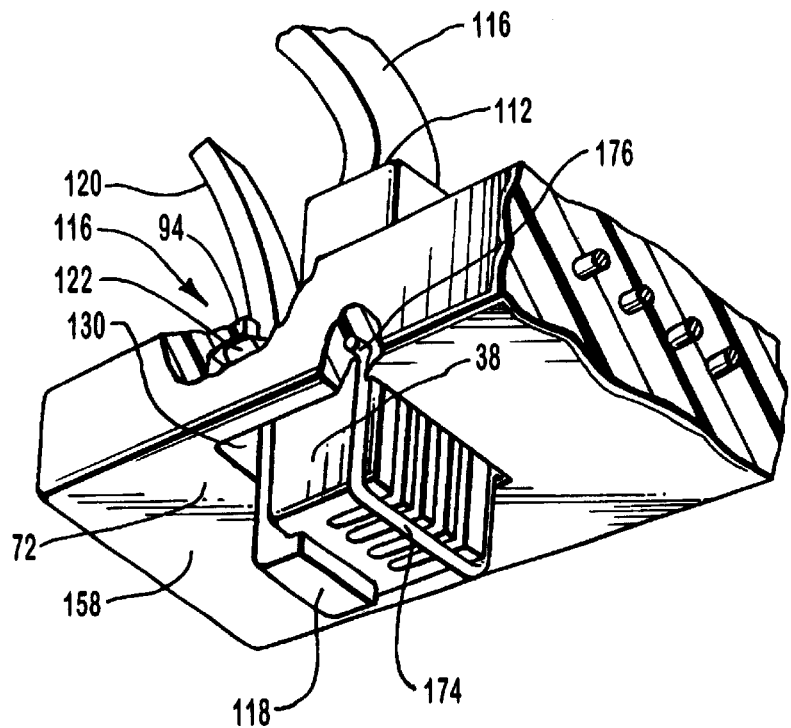
FIG. 16 is a perspective view of another alternative embodiment of an aperture block.

FIG. 16 illustrates another embodiment of the present invention wherein an alternative embodiment of the means for preventing passage of media plug 38 completely through aperture 130 is depicted. By way of example and not limitation, upon introduction of media plug 38 into aperture 130, stirrup 174 is pivoted out of an orientation parallel with lower surface 158 into a perpendicular orientation therewith. Upon reaching a depending condition, stirrup 174 prevents further passage of media plug 38 through aperture 130. At this point a sufficient portion of media plug 38 is extending below surface 158 to allow capture of transition notch 122 of bias retention clip 116 by retention ridge 94 formed in the wall of aperture 130. The sufficient portion of the electrical contacts within media plug 38 remain in the aperture 130 to afford electrical communication with the contact wires formed within retractable aperture block 72.

When media plug 38 is withdrawn from aperture 130, stirrup 174 can be pivoted up into aperture 130. If aperture block 72 is retractable, retraction of aperture block 72 will pivot stirrup 174 into aperture 130 without the need for a spring. Stirrup 174 may also be biased into the aperture 130 by a spring 176. Spring biasing may be useful where aperture block 72 is detachable or where aperture block 72 is formed directly to an electrical apparatus.

Figure 17:
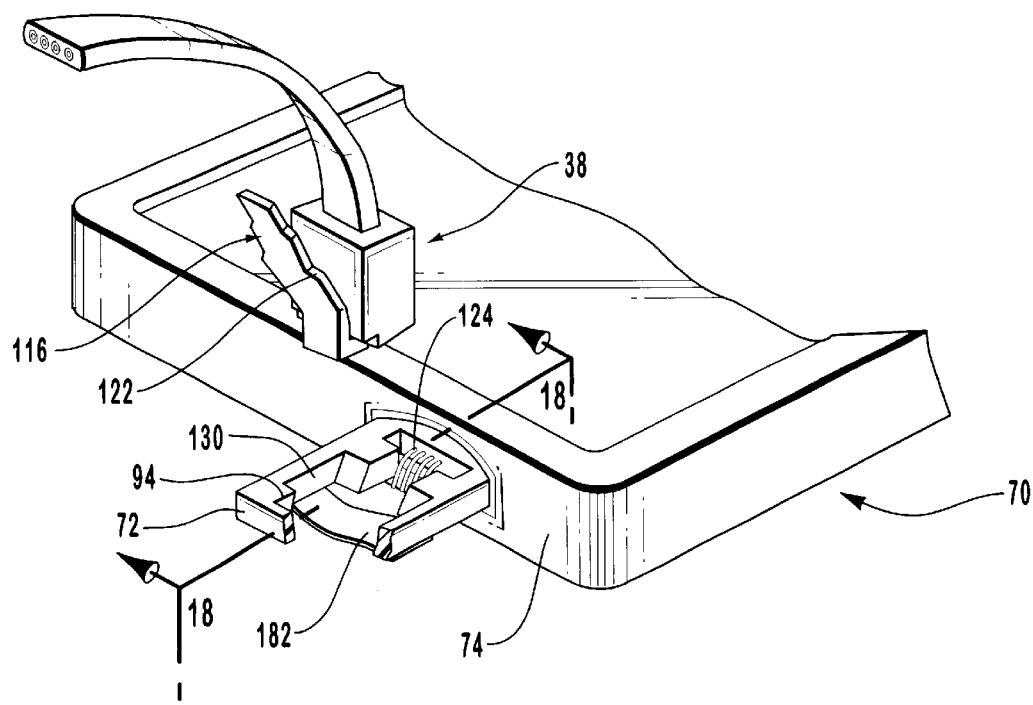
FIG. 17 is a perspective view of another embodiment of an aperture block incorporating a flexible diaphragm.

FIG. 17 illustrates another embodiment incorporating the teachings of the current invention. In this embodiment a perpendicular aperture 130 is employed. Aperture 130 is formed so that when physical/electrical media plug 38 is inserted into aperture 130, at least one contact pin of physical/electrical media plug 38 is held in electrical contact with at least one contact wire 124.

Also depicted in FIG. 17 is an alternative embodiment of the means for preventing physical/electrical media plug 38 from passing completely through aperture 130. By way of example and not limitation, in FIG. 17 the means for preventing passage of media plug 38 through aperture 130 is a flexible diaphragm 182. In this embodiment, flexible diaphragm 182 extends over at least a portion of the bottom of aperture 130. As used in the specification and appended claims, the term "flexible diaphragm" means any flexible membrane that covers at least a portion of aperture 130.

Figure 18:
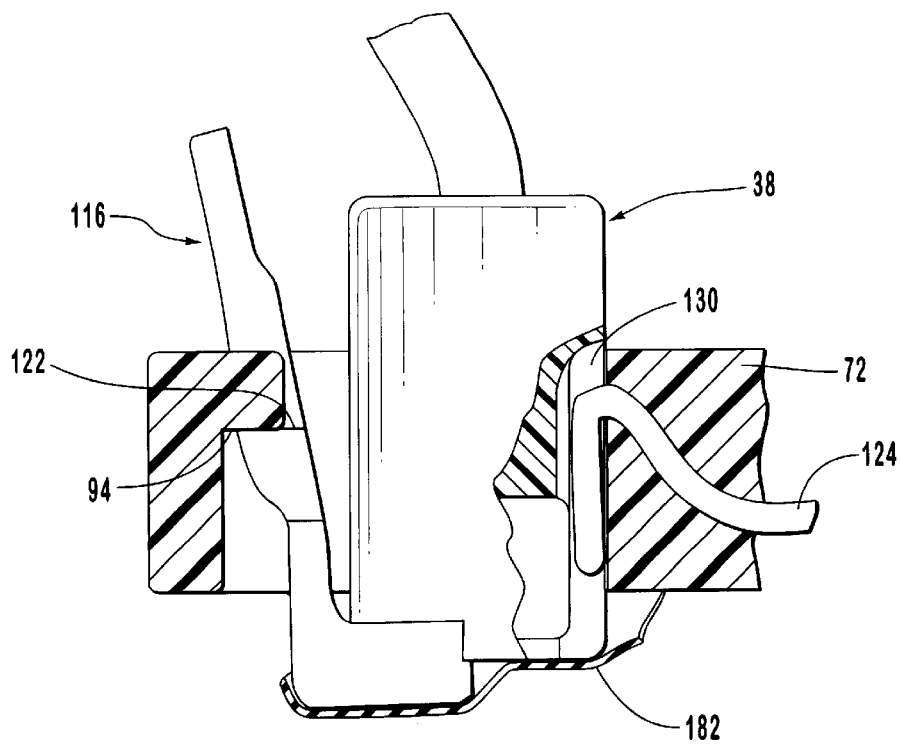
FIG. 18 is a cross-sectional side view taken along the lines 18—18 of the aperture block shown in FIG. 17 having a media plug therein.

FIG. 18 is a cross-sectional view taken along-line 18—18 of FIG. 17 which shows in greater detail the embodiment illustrated in FIG. 17. As physical/electrical media plug 38 is inserted into aperture 130, flexible diaphragm 182 exerts an upward force on media plug 38. The upward force serves to ensure that transition notch 122 is retained by retention ridge 94. It will be appreciated that in accordance with the definition of flexible diaphragm as used in this patent, flexible diaphragm 182 may extend over a portion of aperture 130 or completely cover the bottom of aperture 130.

Figure 19:
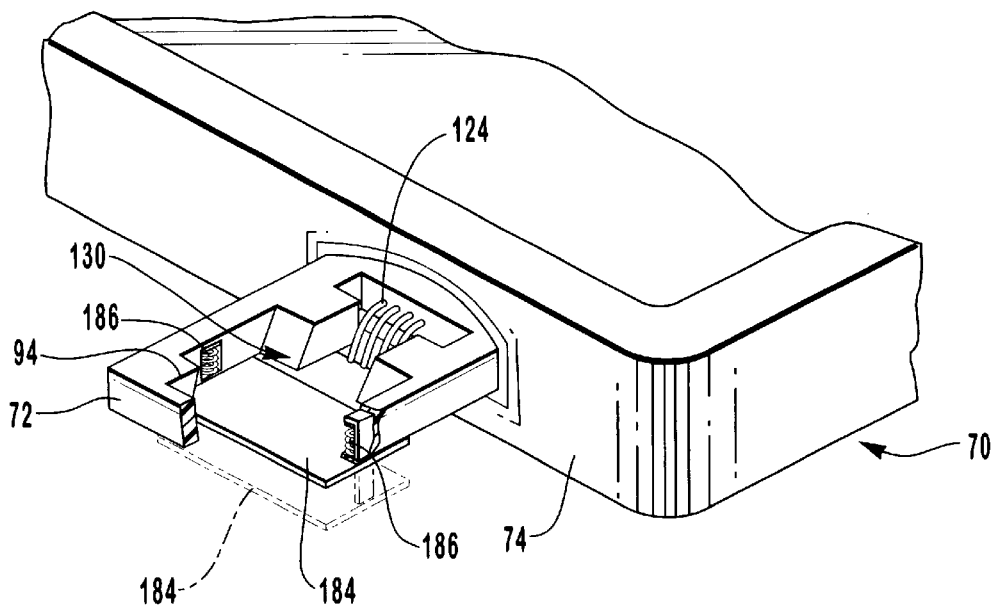
FIG. 19 is a perspective view of yet another embodiment of an aperture block having a spring biased retention plate.

FIG. 19 illustrates another embodiment of the present invention utilizing the teachings of the present invention. In this embodiment, aperture block 72 is provided with perpendicular aperture 130. As in the other embodiments illustrated, aperture block 72 may be detachable from casing 74 or retractable into casing 74. Depicted in FIG. 19 is yet another alternative embodiment of the means for preventing physical/electrical media plug 38 from passing completely through aperture 130. By way of example and not limitation, in this embodiment the passage prevention means comprises faceplate 184 which is positioned across at least a portion of aperture 130. Faceplate 184 is mechanically biased by spring 186. The solid lines of faceplate 184 show the natural state of repose of faceplate 184 while the phantom lines show the state of faceplate 184 when a physical/electrical media plug is pressed into aperture 130.

When a physical/electrical media plug is pressed into aperture 130, faceplate 184 exerts a force opposing insertion of the media plug. The opposing force ensures that the appropriate portion of the media plug is retained by retention ridge 94.

Figure 20:
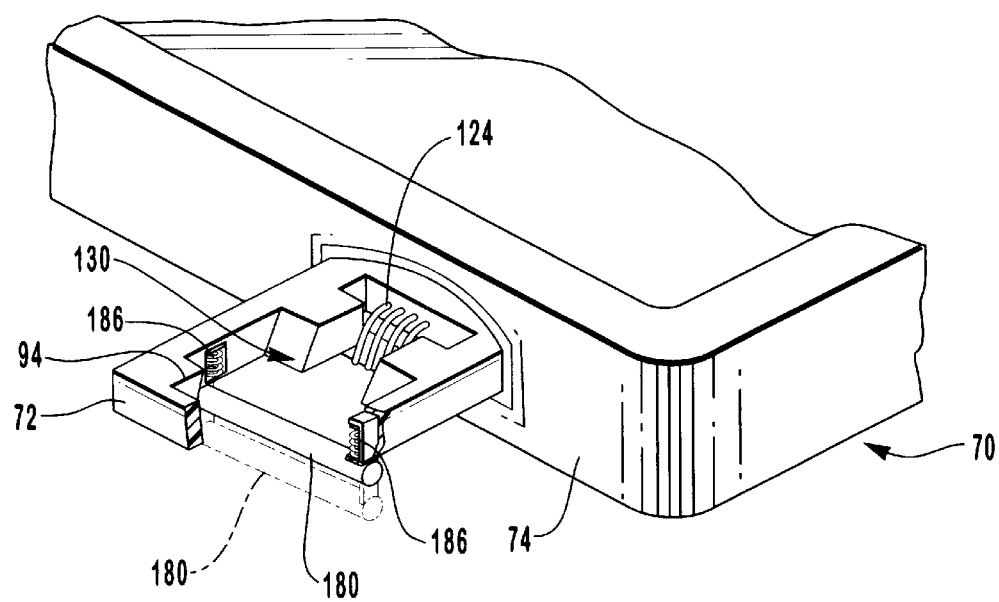
FIG. 20 is a perspective view of an alternative embodiment of an aperture block shown in FIG. 19.

Yet another embodiment incorporating the teachings of the present invention is depicted in FIG. 20. This embodiment is provided with perpendicular aperture 130 and another embodiment of the means for preventing the passage of a physical/electrical media plug through aperture 130 in aperture block 72. By way of example and not limitation, in the illustrated embodiment the means for preventing the passage of the physical/electrical media plug through aperture 130 is retention structure 180. Retention structure 180 is mechanically biased by spring 186. The natural state of repose of retention structure 180 is illustrated by solid lines.

When a physical/electrical media plug is pressed into aperture 130, mechanically biased retention structure 180 exerts an upward force opposing the insertion of the physical/electrical media plug. The upward force ensures that the media plug will be retained within aperture 130. In FIG. 20, the state of retention structure 180 when a physical/electrical media plug is pressed into aperture 130 is shown by phantom lines.

Figure 21:
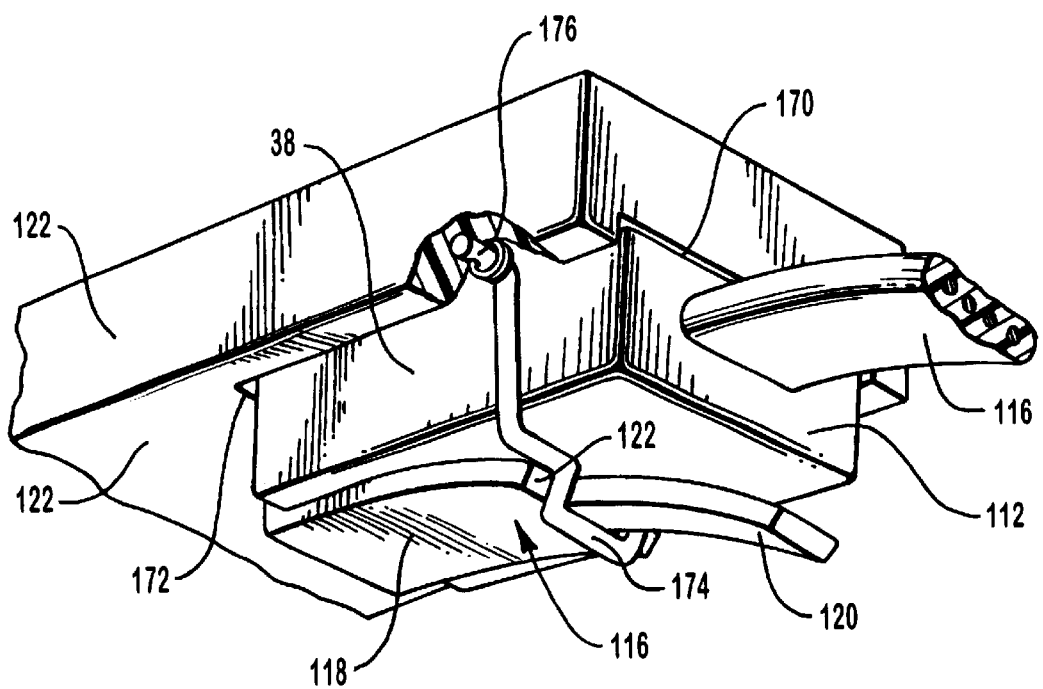
FIG. 21 is a partially broken away perspective view of an alternative aperture block having a channel in which a media plug is received.

FIG. 21 illustrates an alternative embodiment of the coupling means for electronically coupling media plug 38 with aperture block 72. By way of example and not limitation, aperture block 72 is depicted having a retention channel 170 with a longitudinal axis parallel with and formed in lower face 158 thereof. Retention channel 170 serves to resist lateral movement of media plug 38. Channel 170 terminates at an end wall 172 against which media plug 38 abuts when fully inserted into channel 170. Disposed within channel 170 adjacent to end wall 172 are a plurality of contact wires 124 (not shown). The contact wires are biased against the contact pins of media plug 38 when media plug 38 is received within channel 170.

Media plug 38 is held in channel 170 by a support stirrup 174 pivotally attached to aperture block 72. A spring 176 biases support stirrup 174 into channel 170. In use, support stirrup 174 is pivoted out of channel 170 and media plug 38 is inserted into channel 170 so that support stirrup 174 bounds the bottom portion of media plug 38. Media plug 38 is inserted into channel 170 until contact pin block 112 abuts end wall 172 whereupon support stirrup 174 engages transition notch 122 of biased retention clip 116. To disengage media plug 38 from channel 170, retention clip 116 is biased towards contact pin block 112, thereby disengaging support stirrup 174 from transition notch 122.

Figure 22:
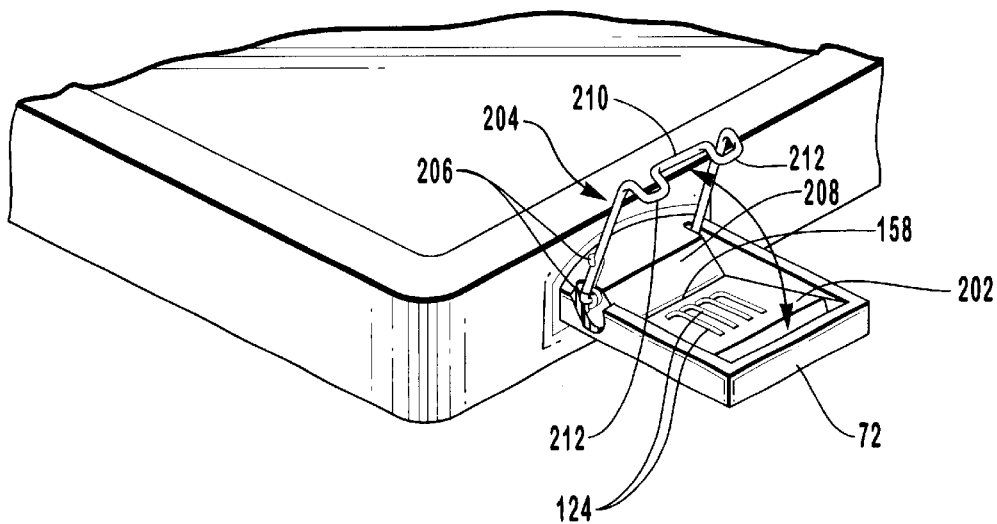
FIG. 22 is a perspective view of an aperture block having an alternative channel configuration interacting with a stirrup to retain a physical/electrical media plug therein.

FIG. 22 illustrates an embodiment of the present invention wherein an alternative embodiment of the coupling means for electronically coupling media plug 38 with aperture block 72 is depicted. By way of example and not limitation, an aperture block 72 is depicted having a channel 202 shaped so as to receive contact pin block 112. A stirrup 204 is positioned on aperture block 72. Stirrup 204 is configured to pivot from a position substantially parallel with aperture block 72 to a position substantially perpendicular thereto. Stirrup 204 is biased by a spring 206 in a direction substantially parallel with aperture block 72.

In use, stirrup 204 is pulled into a perpendicular position to aperture block 72 and media plug 38 is inserted into channel 202 until media plug 38 abuts an end wall 208 of channel 202. Stirrup 204 is then released from its perpendicular position and is urged by spring 206 into contact with the top of media plug 38.

Figure 23:
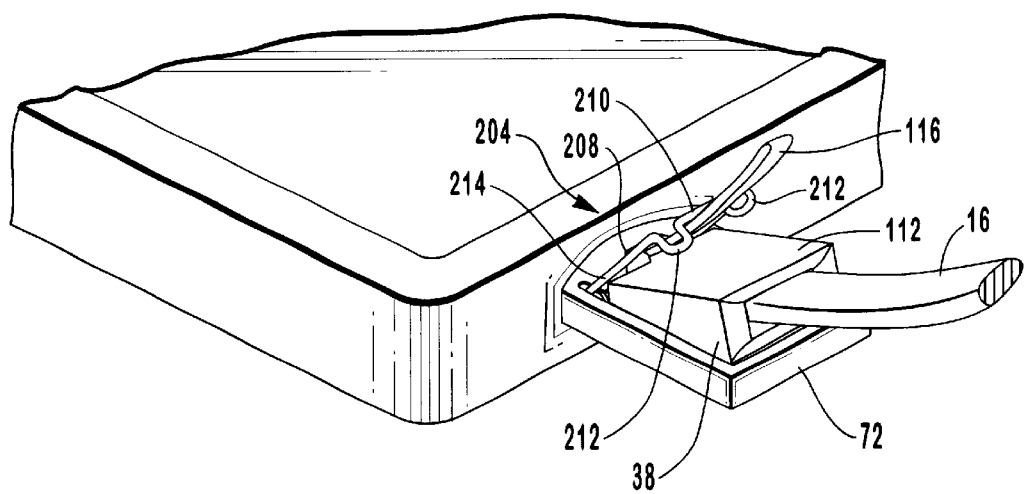
FIG. 23 is a perspective view of the aperture block shown in FIG. 22 having a physical/electrical media plug retained therein.

Contact wires 124 located within the bottom of channel 202 are placed in contact with contact pins 114 in contact pin block 112 when media plug 38 is positioned into abutment with end wall 208, as depicted in FIG. 23. Stirrup 204 is curved so as to provide contact with media plug 38 and has formed therein a bridge 210 which is elevated above the contact points so as to engage transition notch 122 of biased retention clip 116. Pressure is exerted by biased stirrup 204 against media plug 38 within channel 204 to maintain electrical contact between contact wires 124 and contact pins 114.

When connection of media plug 38 is no longer needed, stirrup 204 is lifted back into a perpendicular position and media plug 38 can be removed from channel 202. Biasing of spring 206 will then urge stirrup 204 back into channel 202 and aperture block 72 can be retracted or detached.

The configuration of stirrup 204 is best appreciated by reference to FIG. 23 in which stirrup 204 is shown having bridge 210 and contact points 212. Free ends 214 of stirrup 204 engage apertures (not shown) formed in aperture block 72.

Figure 24:
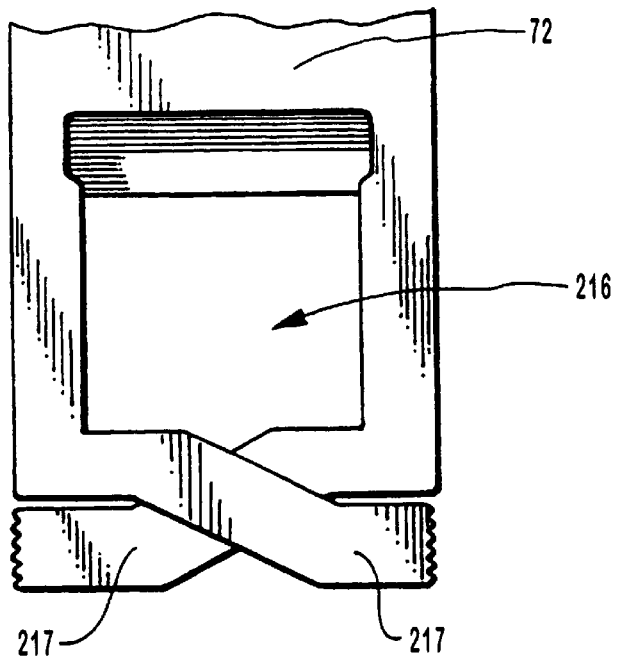
FIG. 24 is a top plan view of an aperture block having compression arms to retain a media plug.

FIG. 24 illustrates another embodiment of the present invention wherein an alternative embodiment of the means for mechanically securing a media plug within an aperture in aperture block 72. By way of example and not limitation, aperture block 72 is depicted having an aperture 216 configured to receive a media plug. It is noted that in the embodiment illustrated in FIG. 24, there is no structure for directly engaging the retaining clip. Instead, the physical/electrical media plug is held in place by friction produced by means for biasing a wall of the aperture against the media plug inserted therein to retain the media plug within the aperture.

By way of example and not limitation, the means for biasing a wall of the aperture utilized in the embodiment illustrated in FIG. 24 comprises compression arms 217. By forming aperture 216 slightly smaller than the media plug, friction is created which maintains the media plug within the aperture. When the media plug is no longer needed, compression arms 217 are biased toward one another by the fingers of the user. This biasing action increases the dimensions of aperture 216, thereby releasing the media plug allowing the media plug to be removed.

Figure 25:
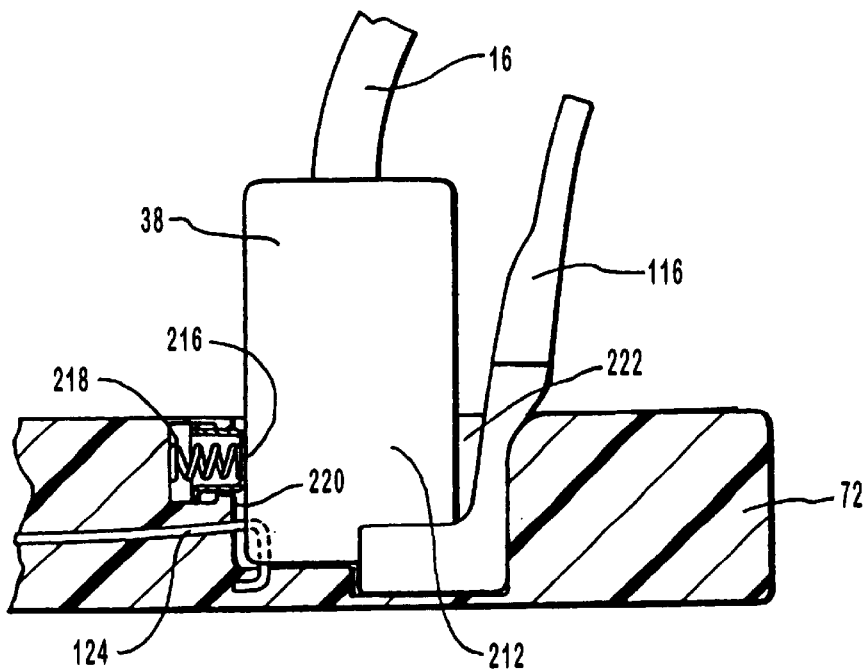
FIG. 25 is a cross-sectional side view of an alternative aperture block having springs recessed in the sides thereof capable of retaining the physical/electrical media plug therein.

Another embodiment of the present invention utilizing friction to retain media plug 38 inside the aperture is depicted in FIG. 25. A spring 218 is mounted within a wall 220 of aperture 216 opposite biased retention clip 116. Aperture 216 is formed with a recess 222 which is formed complementary to the shape of biased retention clip 116. Aperture 216 is formed with a recess 222 which is formed so as to conform to the shape of biased retention clip 116. As spring 218 presses media plug 38 against recess 222, biased retention clip 116 reacts by exerting a compressive force against media plug 38 from the side of the aperture containing recess 222. The combined compressive forces of spring 218 and biased retention clip 116 serve to retain media plug 38 within aperture 216. Contact wires 124 also positioned in wall 220 are placed in electrical communication with contact pins 114 in contact pin block 112 when media plug 38 is fully inserted within aperture 216.

Although spring 218 is located opposite biased retention clip 116 in the embodiment illustrated in FIG. 25, it will be appreciated that one or more springs may be located in any or all of the walls 220 surrounding aperture 216 to produce a retentive force.

Figure 26:
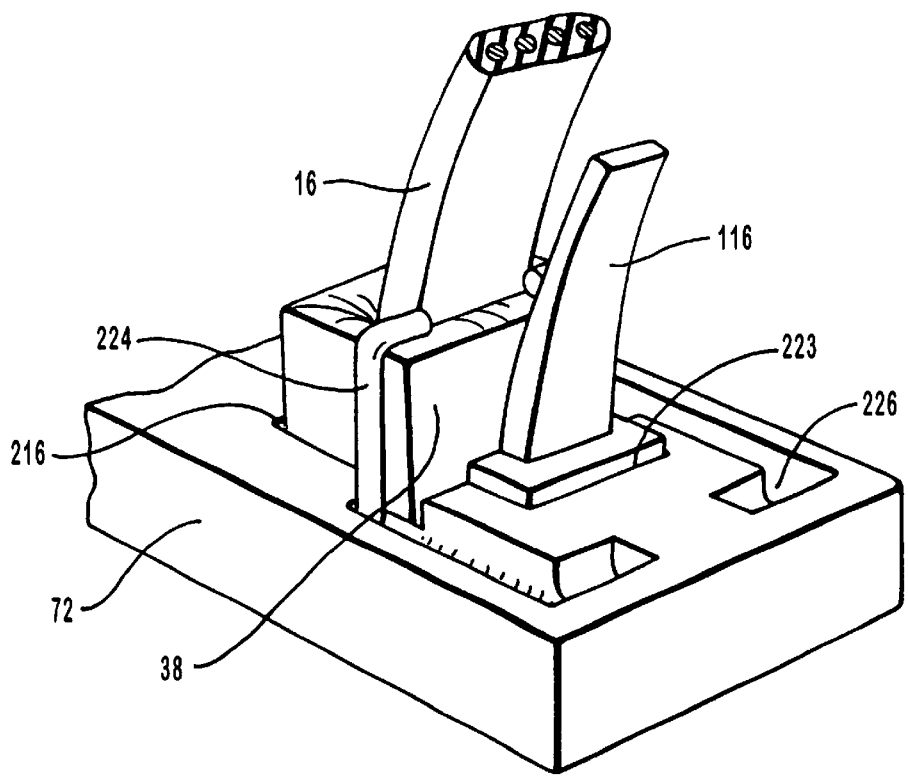
FIG. 26 is a perspective view of an alternative aperture block having a rotatable retention arm for securing a media plug thereto.

In the embodiment illustrated in FIG. 26, aperture 216 is so sized and shaped as to be capable of accepting media plug 38. Aperture 216 is formed in aperture block 72 and has a recess 223 shaped so as to be capable of accepting biased retention clip 116. A retaining arm 224 is pivotally attached to aperture block 72 and is capable of pivoting from a groove 226 formed in aperture block 72 through a 90 degree arc so as to be substantially perpendicular to aperture block 72. For example, when media plug 38 is inserted into aperture 216, retaining arm 224 may be pivoted out of groove 226 past biased retention clip 116 into the position illustrated in FIG. 26. When not in use, retaining arm 224 is pivoted down into groove 226 so that aperture block 72 may be retracted. Retention arm 224 comprises an alternative embodiment of the means for mechanically securing a media plug within an aperture in aperture block 72.

As with other embodiments disclosed herein, electrical communication occurs between contact pins 114 in media plug 38 and contact wires fixed in the wall of aperture 216.

Figure 27:
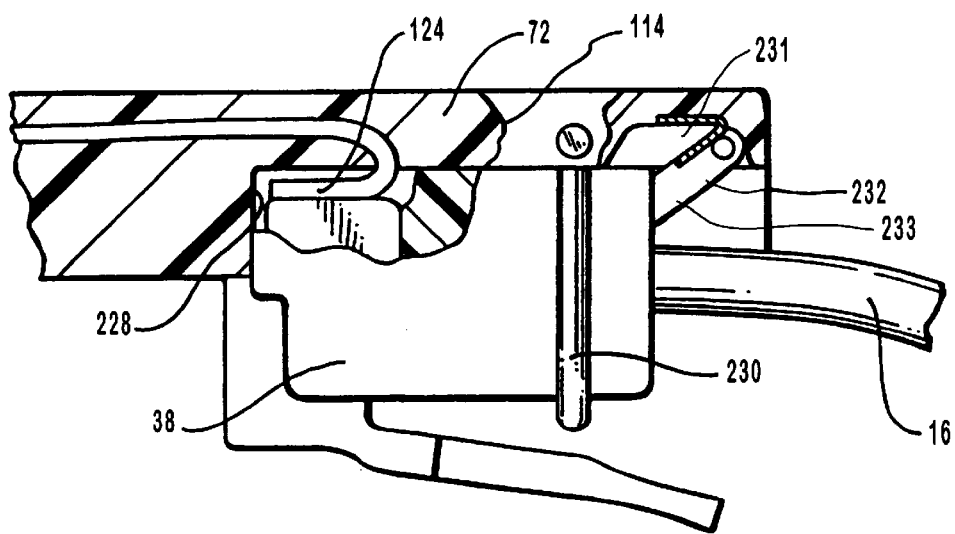
FIG. 27 is a cross-sectional side view of an alternative aperture block having a channel and a retention arm like that shown in FIG. 26 to retain a physical/electrical media plug therein.

Referring now to FIG. 27, another embodiment of the present invention is illustrated in which a channel 228 is formed in the bottom face of aperture block 72. Channel 228 is so sized and configured as to be capable of receiving a portion of physical/electrical media plug 38. A pivoting retention clip 230 is capable of pivoting from a position substantially parallel to the aperture block 72 to a position perpendicular to aperture block 72. When media plug 38 is inserted into channel 228, pivoting retention clip 230 can be pivoted up out of aperture block 72 and over the back of media plug 38 thereby retaining media plug 38 in channel 228.

In addition, a spring loaded pivot block 232 operates within channel 228 to assist in retaining physical/electrical media plug 38 within channel 228. During repose, pivot block 232 is spring biased within a recess 231. To attach media plug 38, free end 233 of pivot block 232 is rotated away from recess 231 and media block is positioned within channel 231. Once positioned, pivot block is released so as to spring bias against the end of media plug 38. When removal of the physical/electrical media plug 38 from channel 228 is desired, pivot block 232 and retention clip 230 are rotated out of the way.

It will be appreciated that pivot block 232 must be located behind media plug 38 a distance so as to allow pivotable movement of pivot block 232 when media plug 38 is in channel 228. After removal of the physical/electrical media plug 38 from channel 228, retention clip 230 is pivoted into a groove (not shown) formed in aperture block 72. Aperture block 72 may then be retracted without interference from retention clip 230 or pivot block 232. Contact pin 114 in media plug 38 are placed in electrical communication with contact wires 124 (not shown) when media plug 38 is retained in channel 228.

Figure 28:
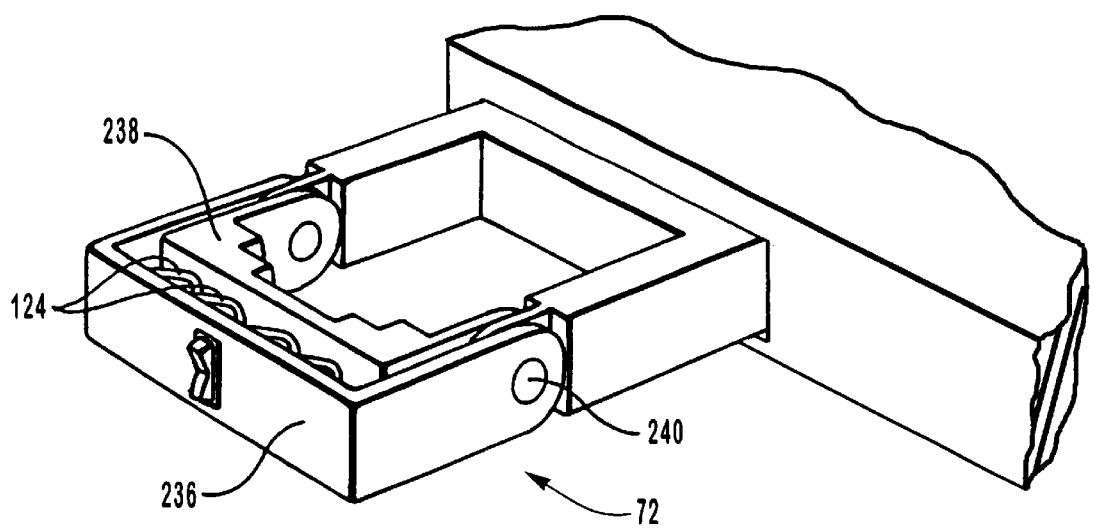
FIG. 28 is a perspective view of an alternative aperture block of the present invention in a folded position.
Figure 29:
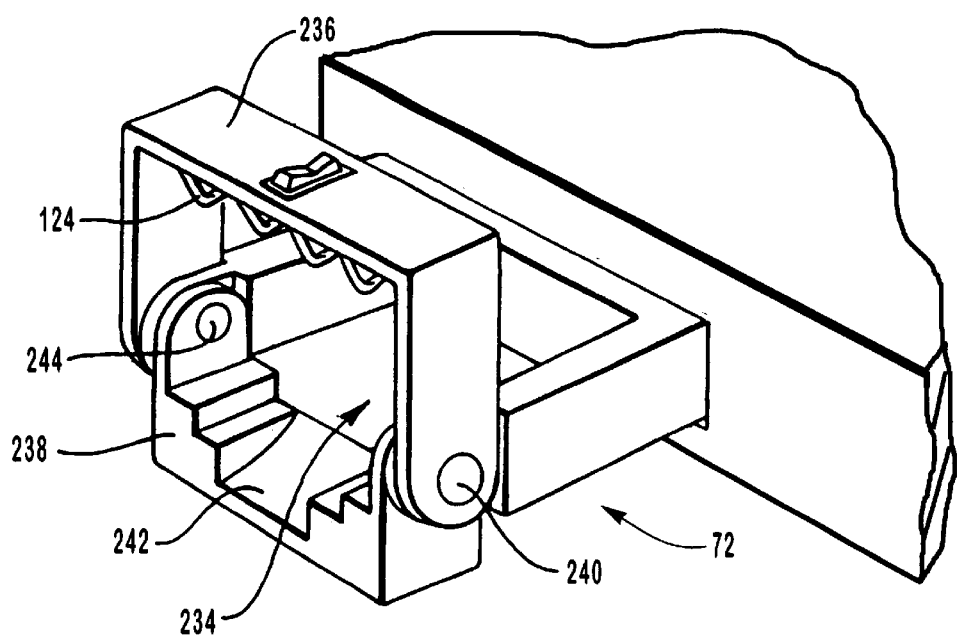
FIG. 29 is a perspective view of the aperture block shown in FIG. 28 in an open position.

FIGS. 28 and 29 depict another embodiment of the present invention in which an alternative embodiment of the means for electronically coupling a media plug with aperture block 72 is disclosed. By way of example and not limitation, a composite aperture 234 is bounded between an upper pivotal member 236 and a lower pivotal member 238, respectively. Upper pivotal member 236 is wider than lower pivotal member 238 and both pivot at common pivotal access 240. A pivot pin 244 passes through both pivotal member 236 and pivotal member 238 at axis 240 and is affixed to arms forming aperture block 72. Upper pivotal member 236 provides only the roof of aperture 234 with the remainder of aperture 234 being provided by lower pivotal member 238. Pivotal members 236 and 238 can be selectively rotated so as to be substantially parallel with the remainder of aperture block 72 when aperture block 72 is retracted or they can be pivoted to a position perpendicular to aperture block 72.

When in the perpendicular position illustrated in FIG. 29, composite aperture 234 is formed within pivotal member 236 and pivotal member 238. Aperture 234 is so sized and shaped so as to be capable of accepting a physical/electrical media plug therein. When media plug 38 is inserted into composite aperture 234, contact pins 114 in media plug 38 come into electrical communication with contact wires 124 formed within an inside surface of upper pivotal member 236. A retention ledge 242 formed within aperture 234 near the entrance thereof, engages the transition notch of media plug 38 to retain the physical/electrical media plug within aperture 234.

To release the physical/electrical media plug, biased retention clip 116 is biased in a direction toward the contact pin block and the physical/electrical media plug may be removed. Lower pivotal member 238 can then be pivoted into a position substantially parallel with the aperture block 72 and upper pivotal member 236 can be pivoted over lower pivotal member 238 into a position substantially parallel with aperture block 72.

Figure 30:
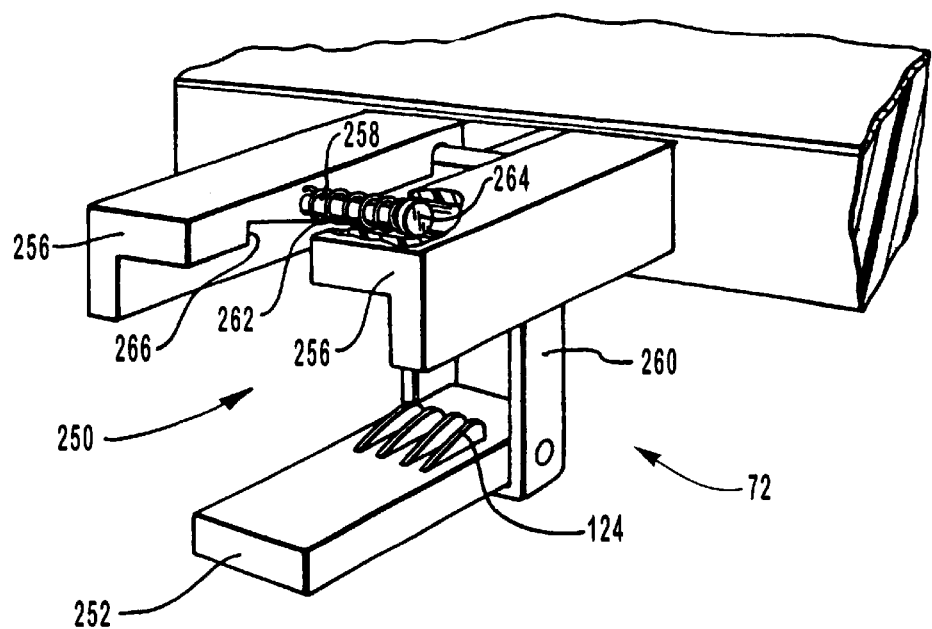
FIG. 30 is a perspective view of an aperture block having a foldable tongue and angled retention bars to form portions of an aperture which receives a physical/electrical media plug.

FIGS. 30–34 depict another embodiment of the present invention in which an alternative embodiment of the means for electronically coupling a media plug with aperture block 72 is disclosed. By way of example and not limitation, FIG. 30 depicts an embodiment of the present invention in which three structures cooperate to form portions of a partial aperture 250. The three structures which cooperate to form partial aperture 250 are tongue 252, and angled retention bars 254 and 256. Angled retention bars 254 and 256 are joined by horizontal guide pins 258 which cumulatively comprise an aperture block 72.

Vertical guide bars 260 join tongue 252 to angled retention bars 254 and 256. A spring 262 operates to bias apart angled retention bars 254 and 256. Stop 264 is positioned so as to limit the travel of angled retention bars 254 and 256 to a point where partial aperture 250 is so sized and shaped so as to be capable of accepting a physical/electrical media plug. Contact wires 124 are located in tongue 252 and are capable of establishing electrical communication with contact pins in media plug 38. A retention notch 266 is formed within in the angled retention bars 254 and 256 and is capable of engaging structures on the physical/electrical media plug to retain the physical/electrical media plug within partial aperture 250.

Figure 31:
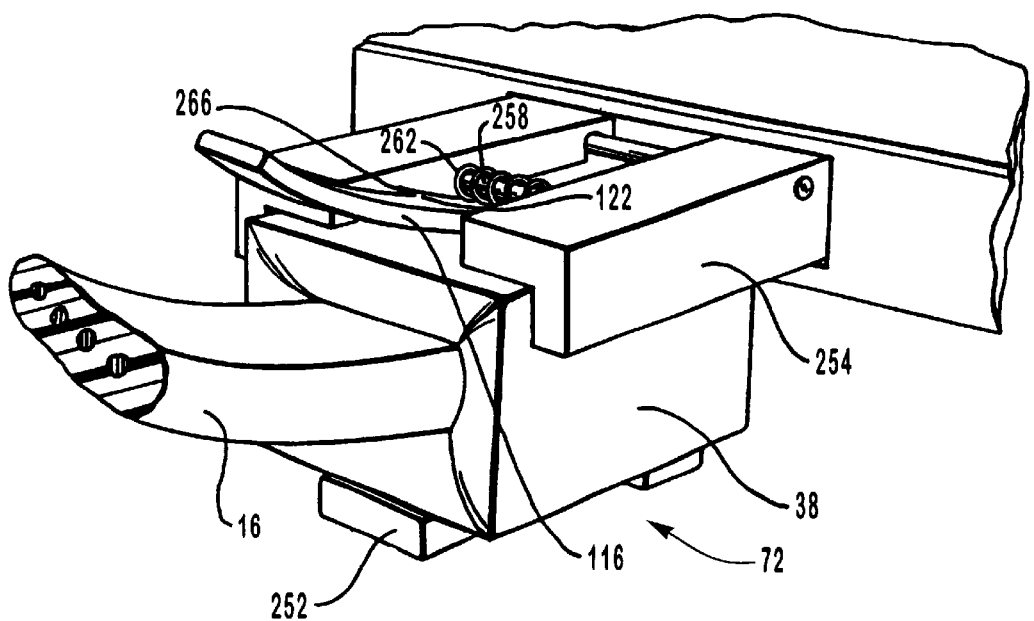
FIG. 31 is a perspective view of the aperture block shown in FIG. 30 having a physical/electrical media plug inserted therein.

FIG. 31 depicts the embodiment illustrated in FIG. 30 where media plug 38 is inserted therein. Retention ledge 266 is shown having retained therein the transition notch 122 of the biased retention clip 116.

Figure 32:
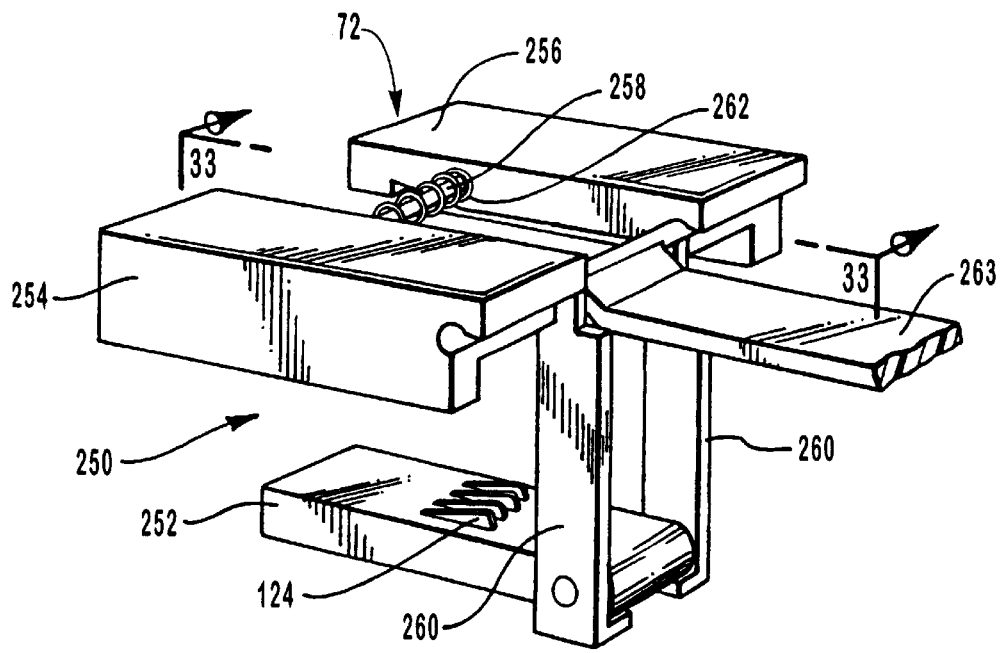
FIG. 32 is a perspective view taken from the rear of the aperture block shown in FIGS. 30 and 31.

For more complete understanding of the embodiment illustrated in FIGS. 30 and 31, reference should now be made to FIG. 32. FIG. 32 depicts partial aperture 250 when viewed from the rear of the aperture. The structures forming partial aperture 250 are joined to the casing of the electrical apparatus by an anchor 263. The bottom of media plug 38 is supported by tongue 252 and electrical communication occurs at contact wires 124.

Figure 33:
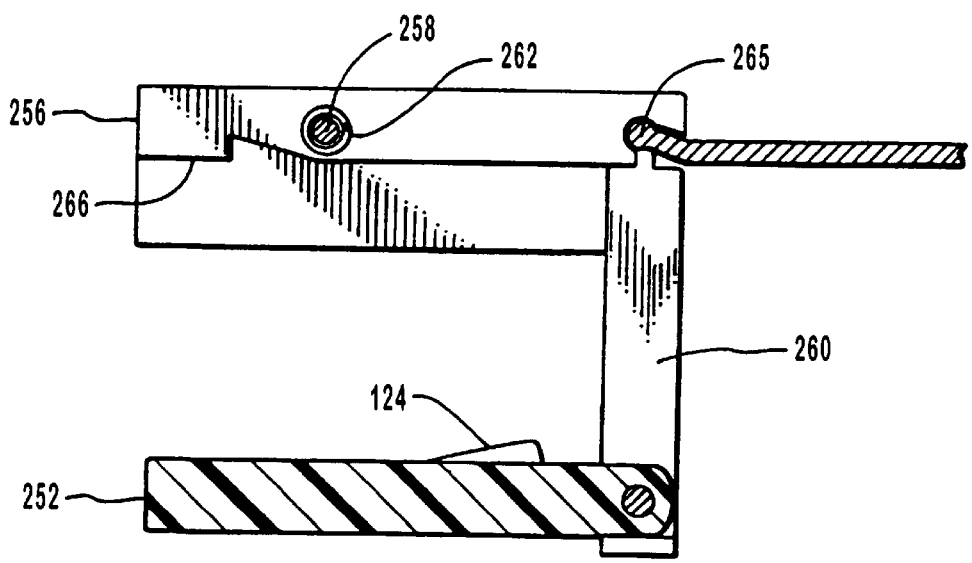
FIG. 33 is a cross-sectional side view of the aperture block shown in FIG. 32 taken along lines 33—33.
Figure 34:
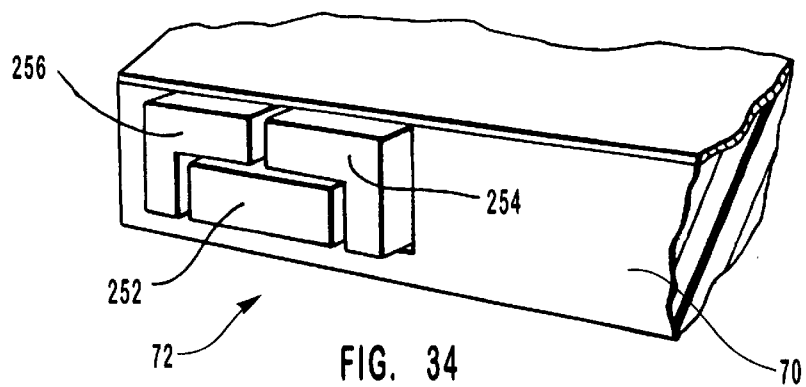
FIG. 34 is a perspective view of the aperture block shown in FIGS. 31–33 retracted into the housing of the electrical apparatus.

FIG. 33 is a cross-section taken along lines 33—33 in FIG. 32 illustrating the pivotal elements of that embodiment. Vertical guide bars 260 are capable of pivoting upward in a counter-clockwise direction when viewed in FIG. 33, and tongue 252 is capable of being folded into the area between vertical guide bars 260. After tongue 252 and vertical support bars 260 are pivoted up into a position parallel with aperture block 72, angled retention bars 254 and 256 are pressed together into a configuration depicted in FIG. 34. When tongue 252 and angled retention bars 254 and 256 have been pressed together, those structures may then be retracted into the casing of electrical apparatus 70.

Figure 35:
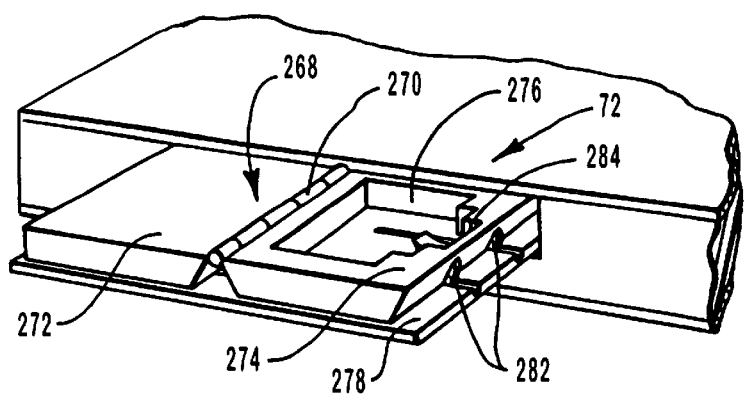
FIG. 35 is a perspective view of an alternative aperture block having a hinged support wall and an access wall in a collapsed position.

Another embodiment of the present invention is illustrated in FIG. 35 in which a aperture block 72 houses an aperture support structure 268. Aperture support structure 268 comprises hinge 270 joining a support wall 272 to an access wall 274. Formed within access wall 274 is an aperture 276 which is so sized and configured so as to be capable of accepting a physical/electrical media plug. Support wall 272 serves to not only support the top of access wall 274, but also houses contact wires 124 which are placed in electrical communication with contact pins located within the physical/electrical media plug when the media plug is inserted into aperture 276.

A base 278 has formed therein a track 280 which directs guides 282 formed in the lower edge of access wall 274. Guides 282 are shaped so as to not only slide within tract 280, but also serve to retain the lower edge of access wall 274 against base 278.

Figure 36:
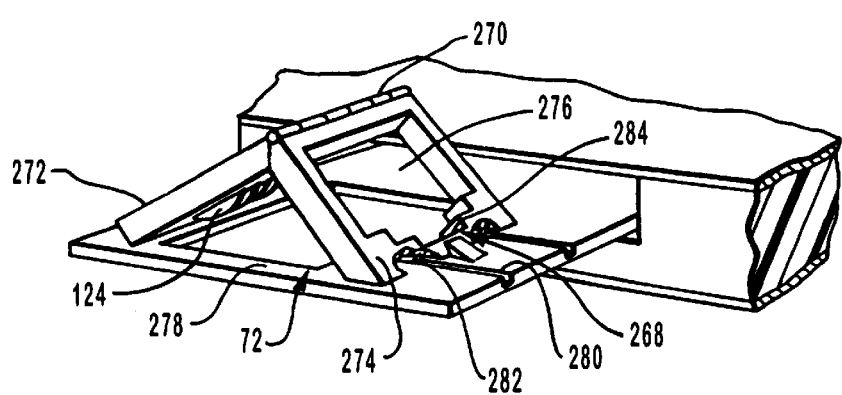
FIG. 36 is a perspective view of the aperture block shown in FIG. 35 in an upstanding position.

When a user wishes to utilize aperture support structure 268, pressure is exerted by the user against the base of access wall 274 causing compression near hinge 270. As illustrated in FIG. 36, this compression results in the elevation of both support wall 272 and access wall 274.

A stop located within track 280 halts the progress of guides 282 and thereby positions access wall 274 in proper alignment with support wall 272 to provide electrical communication between the physical/electrical media plug contact pins and contact wires 124.

In addition, when properly positioned, the combination of base 278, access wall 274, and support wall 272 provide support for and retain the physical/electrical media plug therein. For example, base 278 serves to support the bottom edge of the physical/electrical media plug while aperture 276 serves to limit the lateral travel of the physical/electrical media plug. A notch 284 is so sized and configured so as to be capable of engaging the transition notch of the biased retention clip.

When the user wishes to remove the physical/electrical media plug from the aperture support structure, the biased retention clip is pressed toward the contact pin block and a physical/electrical media plug is removed from aperture 276. Thereafter, pressure is applied in the area of hinge 270 to flatten aperture support structure 268. When flattened, aperture support structure 268 may be retracted within the electrical apparatus.

Figure 37:
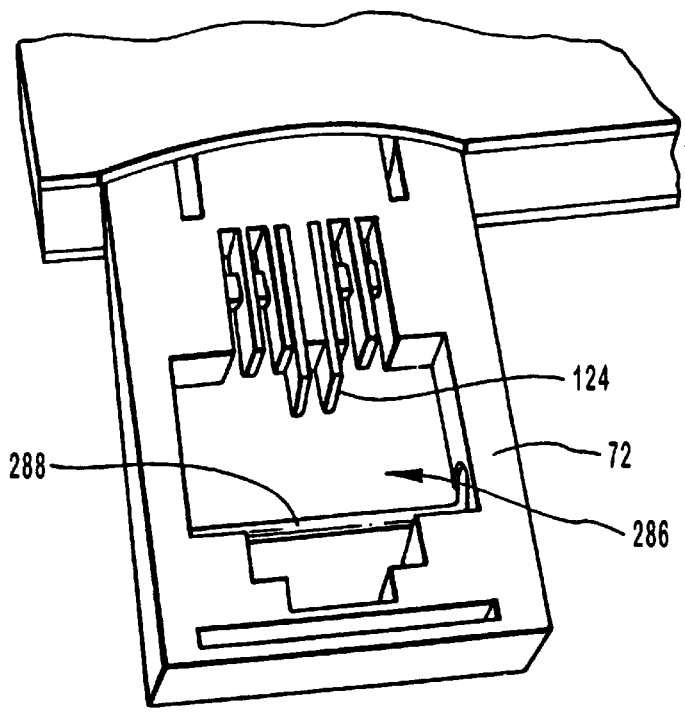
FIG. 37 is a perspective view of an alternative aperture block using a depending stirrup to prevent passage of the physical/electrical media plug completely through the aperture.

Another embodiment of the present invention is illustrated in FIG. 37 in which aperture block 72 houses an aperture 286 capable of accepting a physical/electrical media plug. Contact wires 124 protrude into aperture 286 so as to be capable of making electrical communication with contact pins located within the physical/electrical media plug when the physical/electrical media plug is inserted into aperture 286. A stirrup 288 limits the progress of the physical/electrical media plug through aperture 286.

Figure 38:
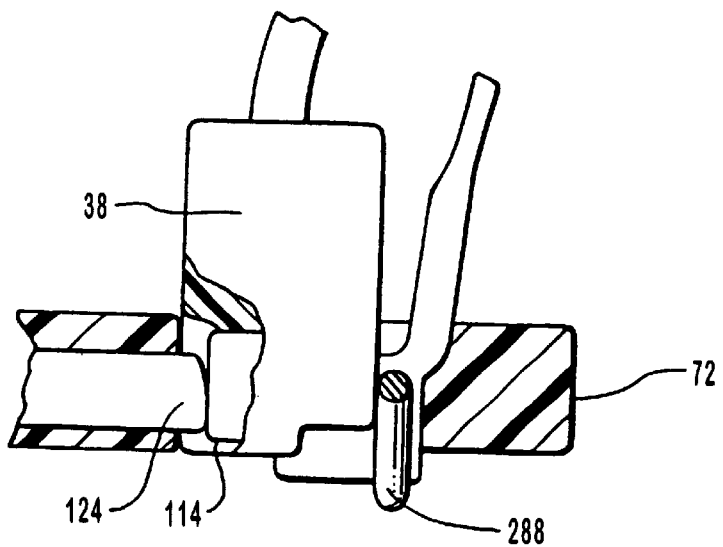
FIG. 38 is a partially broken away cross-sectional side view of the aperture block shown in FIG. 37 having the physical/electrical media plug received therein.

A better understanding of the interrelationship of stirrup 288 with aperture 286 may be had by referring to FIG. 38 in which a cross-sectional elevational view of the embodiment illustrated in FIG. 37 is presented. Stirrup 288 is pivotally engaged in aperture block 72 and depends therefrom. As stirrup 288 is positioned so as to pass across a portion of aperture 286, physical/electrical media plug 38 cannot pass therethrough. Physical/electrical media plug 38 rests on stirrup 288 when in use.

When electrical communication between the electrical apparatus and the physical/electrical media plug is no longer required, the physical/electrical media plug is withdrawn from aperture 286 and aperture block 72 is retracted back into the electrical apparatus. As stirrup 288 is pivotally mounted within the retractable access portion, the retracting action initiates contact between the electrical apparatus and stirrup 288 as the retractable access portion is retracted. Stirrup 288 pivots up into the retractable access portion and does not interfere with the retraction thereof. When the retractable access portion is to be extended, stirrup 288 pivots out of aperture block 72 and depends therefrom.

Figure 39:
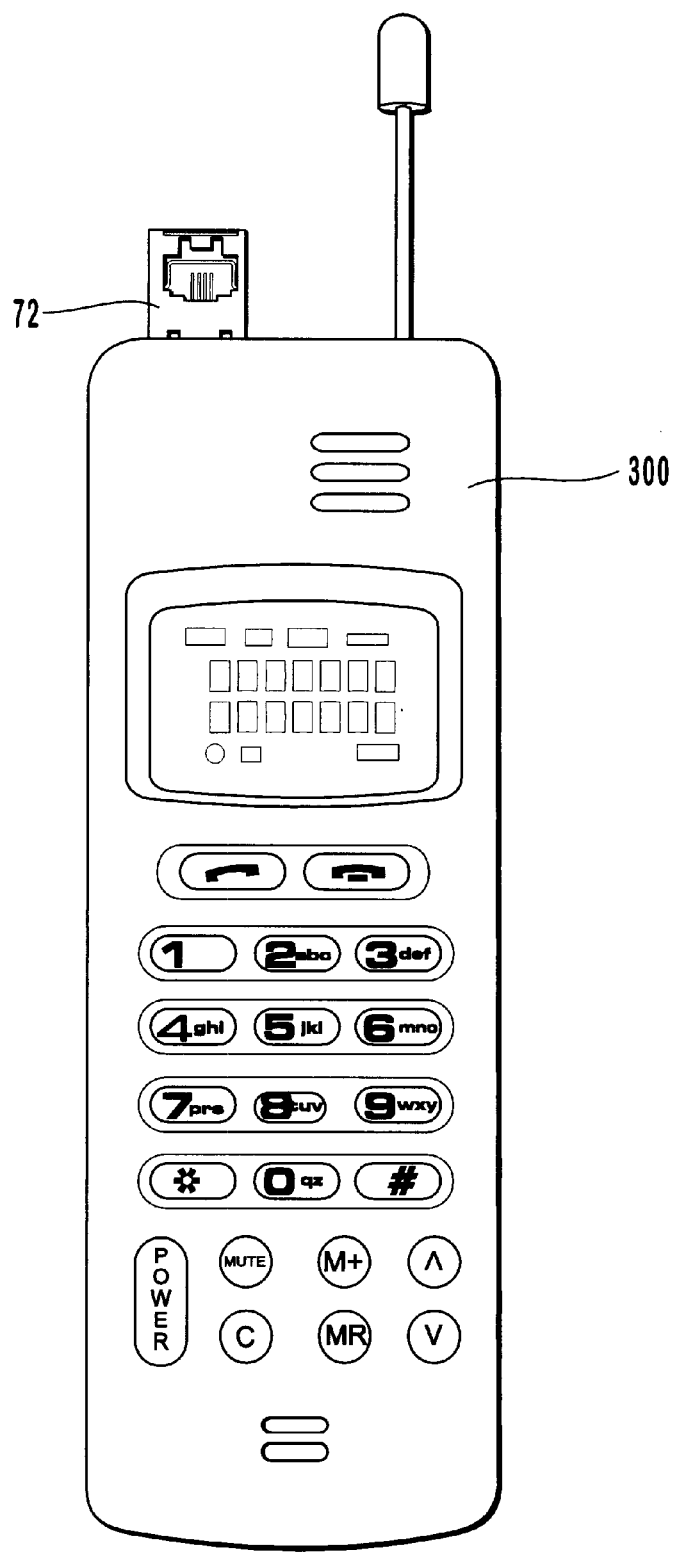
FIG. 39 is a top plan view of an inventive aperture block projecting from a mobile telephone.
Figure 40:
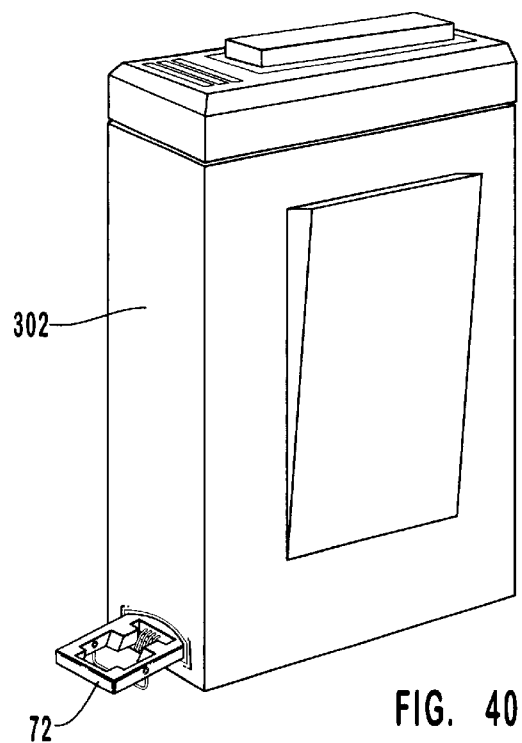
FIG. 40 is perspective view of an inventive aperture block projecting from a pager.
Figure 41:
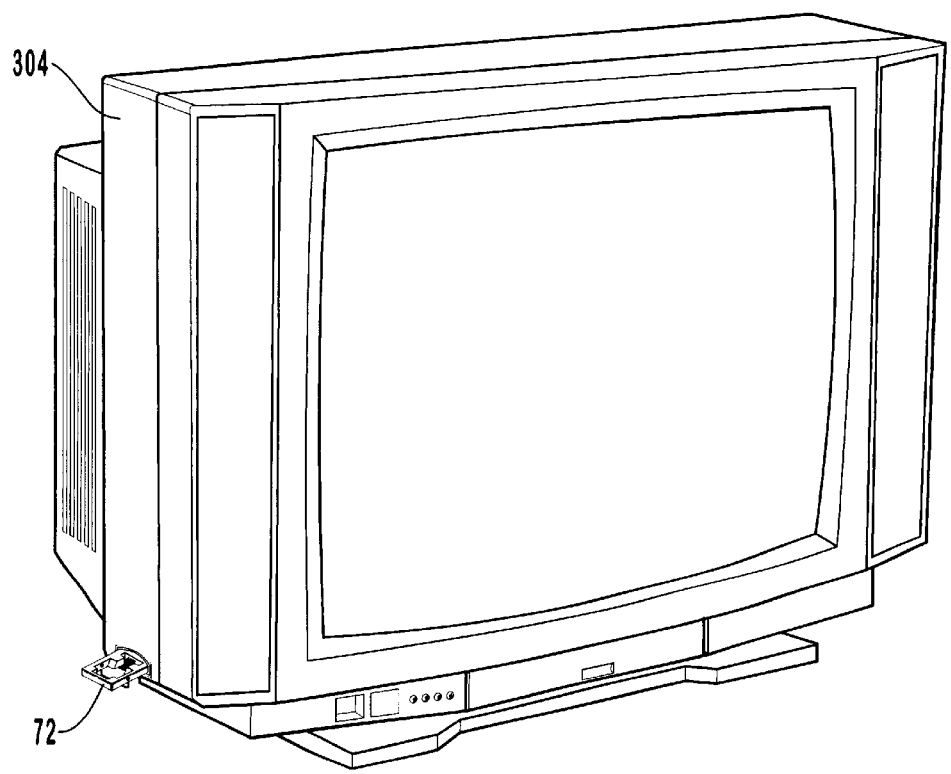
FIG. 41 is a perspective view of an inventive aperture block projecting from a television.
Figure 42:
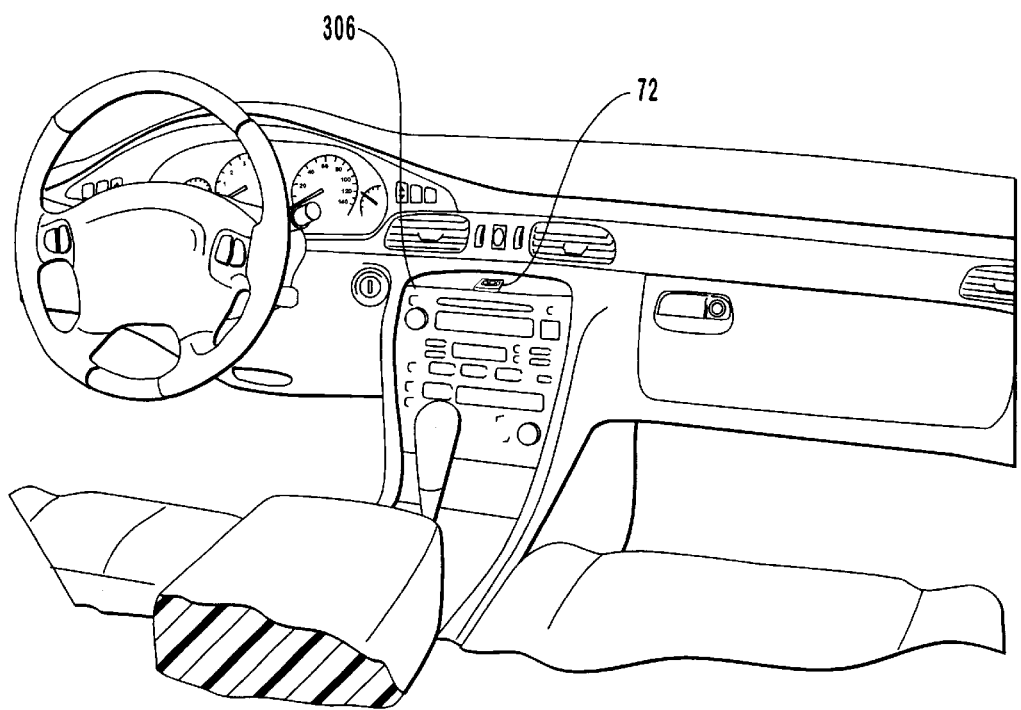
FIG. 42 is the perspective view of an inventive aperture block projecting from an automobile dashboard.

Depicted in FIGS. 39–42 are alternative embodiments of electrical apparatus on which aperture blocks can be attached. The electrical apparatus depicted therein are provided by way of example and in no way limit the scope of electrical apparatus. For example, depicted in FIG. 39 is a mobile telephone 300 having an aperture block 72 mounted thereon. Depicted in FIG. 40 is a pager 302 having an aperture block 72 mounted thereon. FIG. 41 depicts a television 304 having an aperture block 72 mounted thereon. Finally, FIG. 42 depicts an automobile dashboard 306 having an aperture block 72 mounted thereon.

Figure 43:
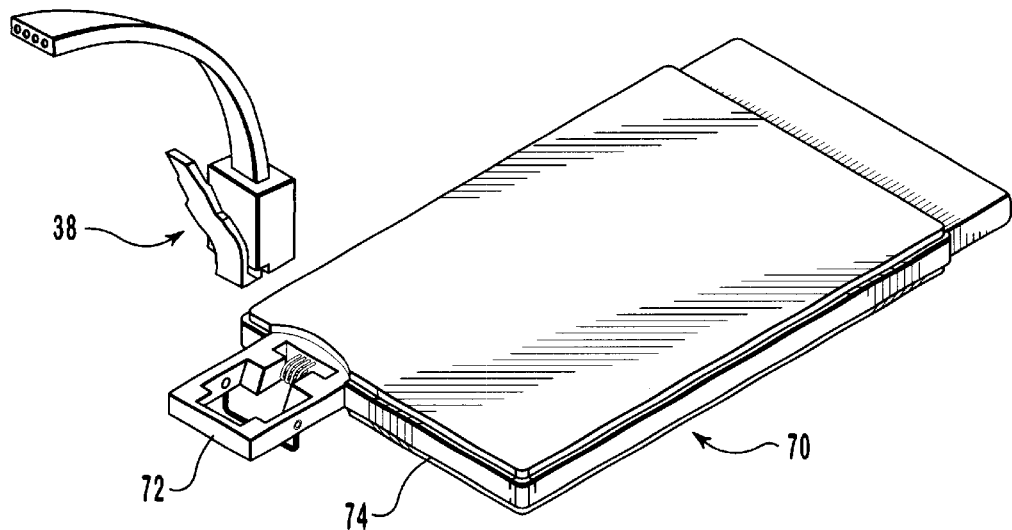
FIG. 43 is a perspective of one embodiment which incorporates a retractable aperture block.

Depicted in FIGS. 43–49 are further details of various embodiments and alternative embodiments of the invention. For example, FIG. 43 illustrates a thin-architecture communications card 70 having an aperture block 72 and a fixed portion 74. A physical/electrical media connector is also shown generally as 38. Aperture block 72 is retractable into fixed portion 74. Fixed portion 74 is in electrical connection to a computer (not shown). Aperture block 72 is in electrical connection with fixed portion 74. This figure illustrates, generally, one system for achieving direct connection to a physical/electrical media connector 38 with a thin-architecture communications card 70.

Figure 44:
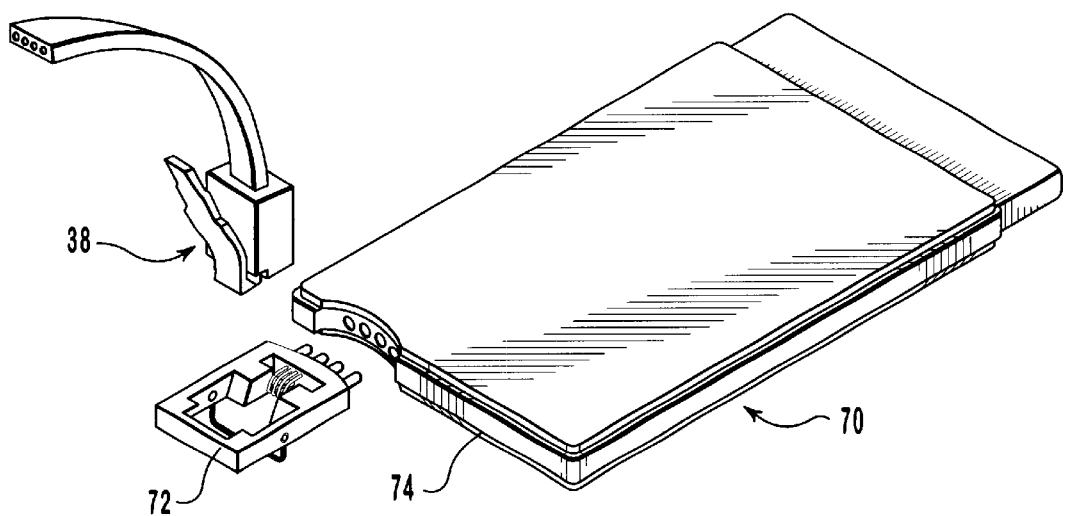
FIG. 44 is a perspective of one embodiment which incorporates a detachable aperture block.

FIG. 44 illustrates a thin-architecture communications card 70 also having an aperture block 72 and a fixed portion 74. In this embodiment, aperture block 72 is detachable from fixed portion 74. This is another general system for achieving direct connection to a physical/electrical media connector 38 with a thin-architecture communications card 70. Detachable aperture block 72 is in electrical connection with fixed portion 74 when attached. Fixed portion 74 is in electrical connection with a computer (not shown). As used in this application, the term aperture block refers to either an aperture block that is retractable as depicted in FIG. 43, or an aperture block that is detachable as depicted in FIG. 44. In the absence of any specific designation, the term aperture block should be construed throughout this application to include either or both retractable and detachable functions.

Figure 45:
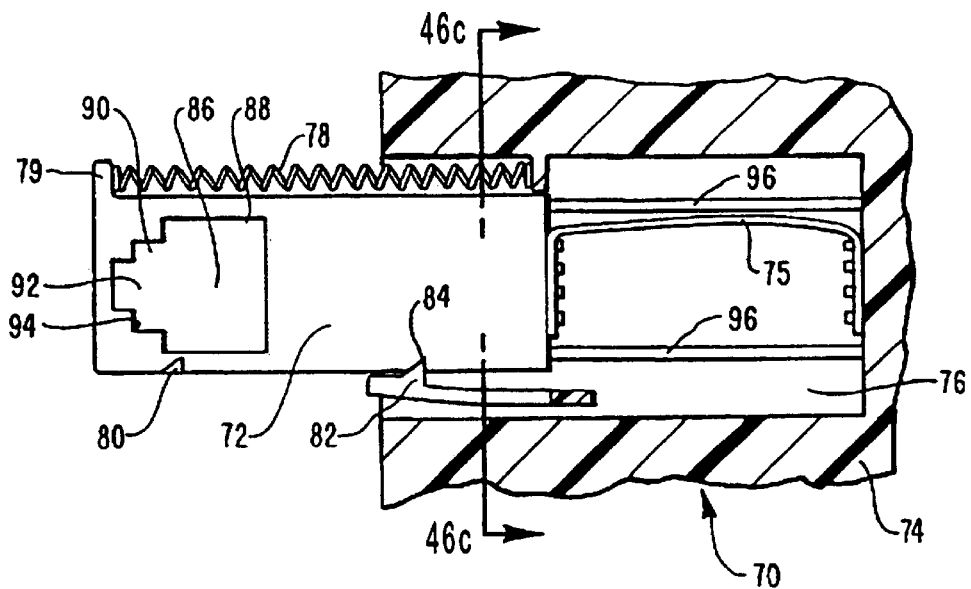
FIG. 45 is a plan view of a first embodiment of a thin-architecture communications card within the scope of the present invention wherein the card is extended ready for insertion by a connector.

FIG. 45 shows an enlargement of one embodiment where aperture block 72 is retractable into fixed portion 74. Fixed portion 74 is in electrical communication with a computer (not shown). Retractable aperture block 72 is in electrical communication with fixed portion 74 through a flexible wire ribbon 75. Retractable aperture block 72 slides in and out of a slot 76 formed within communications card 70. Retractable aperture block 72 is urged out of slot 76 by a spring 78.

According to one aspect of the present invention, the communications card such as illustrated in FIG. 45 is provided with means for biasing the retractable aperture block of the communications card in a direction external to the computer housing.

By way of example and not limitation, the biasing means of the embodiment illustrated in FIG. 45 comprise spring 78 and at least one spring ramp 79. A retention notch 80 in combination with a biased lever 82 retains retractable aperture block 72 within the housing of the computer.

According to another aspect of the present invention, the communications card such as is illustrated in FIG. 45 is provided with means for selectively retaining the retractable aperture block of the communications card within the computer housing.

By way of example and not limitation, the selective retention means of the embodiment illustrated in FIG. 45 comprise retention notch 80 and biased lever 82. A limiting notch 84 is engaged by biased lever 82 when the communications card is extended from the computer housing.

According to still another aspect of the present invention, a communications card such as the communications card illustrated in FIG. 45 is provided with means for restricting the travel of the retractable aperture block of the communications card to a predetermined distance.

By way of example and not limitation, the travel restricting means of the embodiment illustrated in FIG. 45 comprise biased lever 82 and limiting notch 84. Biased lever 82 serves as an actuating mechanism to initiate exposure or retraction of the retractable aperture block of the communications card.

By way of example and not limitation, an aperture 86 having a plurality of walls 88 is formed within retractable aperture block 72. Aperture 86 is so sized and shaped as to be capable of receiving a physical/electrical media connector. Within aperture 86 is formed a broad retention clip groove 90, a narrow retention clip groove 92, and a retention ridge 94. The structures within aperture 86 provide for the retention of a connector pin block of a physical/electrical media connector. A guide track 96 is formed within communications card 70 protruding upwardly from the bottom of communications card 70. Guide track 96 is inter-engaged with a corresponding guide groove formed in the bottom of retractable aperture block 72.

When a user wishes to connect a telephone line to the communications card, biased lever 82 is manipulated out of retention notch 80. As retractable aperture block 72 is released from the grip of biased lever 82, tension applied by spring 78 urges retractable aperture block 72 out of slot 76. The progress of retractable aperture block 72 is guided by guide track 96 and is halted when biased lever 82 engages limiting notch 84. A user then inserts a physical/electrical media connector into aperture 86 to provide an electrical connection between communications card 70 and the telephone line.

According to one aspect of the present invention a communications card such as communications card 70 provides means for biasing the retractable aperture block of the communications card in a direction away from the computer housing.

By way of example and not limitation, the biasing means employed in the embodiment illustrated in FIG. 45 comprise sprung wire 78. When a user no longer wishes access to aperture block 72, the user merely presses retractable aperture block 72 back within the confines of the computer housing such that retention notch 80 will be engaged by biased lever 82 to prevent inadvertent exposure of retractable aperture block 72 outside of the computer housing.

According to another feature of the present invention a communications card such as communications card 70 is provided with means for selectively retaining the retractable aperture block of the communications card within a computer housing. By way of example and not limitation, the selective retention means at the embodiment illustrated in FIG. 45 comprise retention notch 80 and biased lever 82.

After use, the physical/electrical media connector is removed from aperture 86, and biased lever 82 is removed from limiting notch 84. Pressure opposing spring 78 is then applied until biased lever 82 engages retention notch 80. Engagement of biased lever 82 into retention notch 80 secures the communications card within the housing of the computer, thereby protecting the communications card from breakage during transport of the computer. Direct connection of a physical/electrical media connector to the communications card eliminates the need for an external DAA and also eliminates the need for an enclosed physical/electrical media connector socket.

According to one aspect of the present invention, a thin-architecture communications card such as the communications card illustrated in FIG. 45 is provided with means for maintaining electrical communication between the retractable aperture block of the communications card and the fixed remainder of the communications card as the retractable aperture block of the communications card travels in and out of the computer housing.

By way of example and not limitation, the electrical communication maintenance means of the embodiment illustrated in FIG. 45 comprise flexible wire ribbon 75. Flexible wire ribbon 75 is connected at one end both physically and electrically to communications card 70. The other end of flexible wire ribbon 75 is connected both physically and electrically to aperture block 72.

Figure 46A:
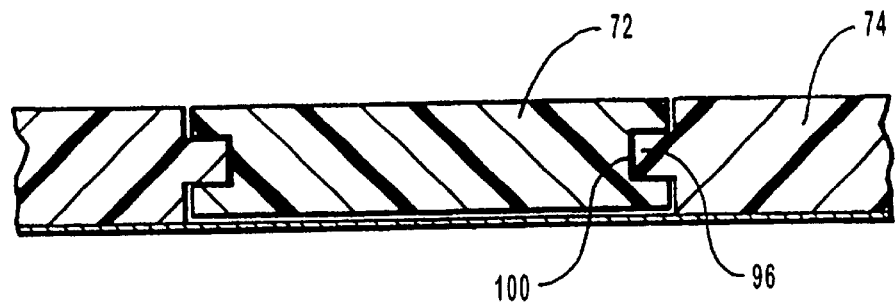
FIG. 46a is a cross-sectional view of a retractable aperture block of a communications card of the present invention and mounted in a remainder of the communications card.

FIG. 46a illustrates retractable aperture block 72 of thin-architecture communications card 70 interengaged with fixed portion 74 through the interaction of guide track 96 with guide channel 100.

Figure 46B:
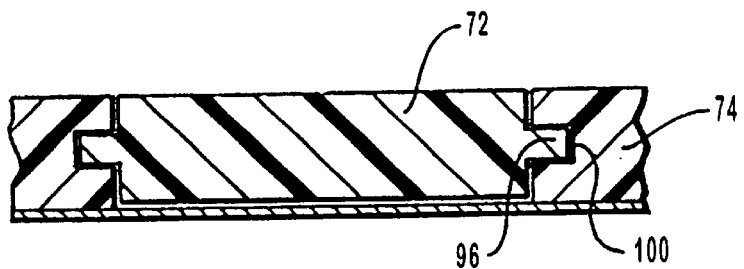
FIG. 46b is a second embodiment of a retractable aperture block such as that illustrated in FIG. 13a also mounted in a thin-architecture communications card.
Figure 46C:
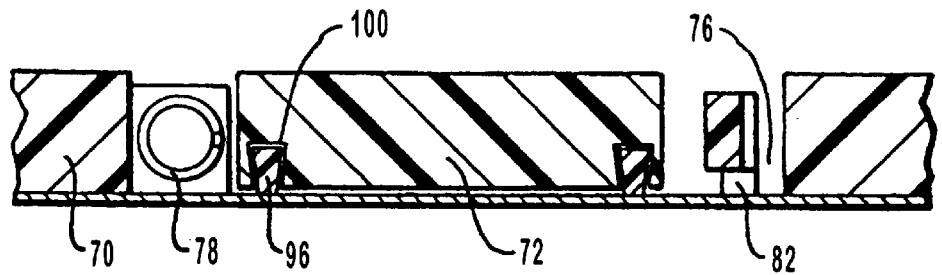
FIG. 46c is a cross-section of the communications card taken along lines 13c—13c in FIG. 12.

According to one aspect of the present invention, a communications card such as communications card 70 illustrated in FIGS. 46a–c provides means for guiding the travel of the retractable aperture block of the communications card as the retractable aperture block of the communications card travels in and out of the computer housing.

By way of example and not limitation, the guiding means of the embodiment illustrated in FIGS. 46a–c comprise guide channel 100 and guide track 96. When access to retractable aperture block 72 is required, the user manipulates retractable aperture block 72 through a slot in the housing in the computer guided by guide track 96 and guide channel 100.

FIG. 46b illustrates an alternate embodiment of the guiding means illustrated in 13a, wherein the guide track 96 and guide channel 100 are reversed such that guide track 96 is formed in fixed portion 74 and guide channel 100 is formed in aperture block 72.

FIG. 46c is a cross-sectional view taken along lines 13c—13c of FIG. 12 illustrating the interaction of retractable aperture block 72 with communications card 70. Retractable aperture block 72 is shown having guide channel 100 through which guide track 96 slides when aperture block 72 is urged out of slot 76 by spring 78. Guide track 96 is formed on the bottom of thin-architecture communications card 70 protruding upward whereas guide channel 100 is formed in the bottom of retractable aperture block 72.

Figure 47:
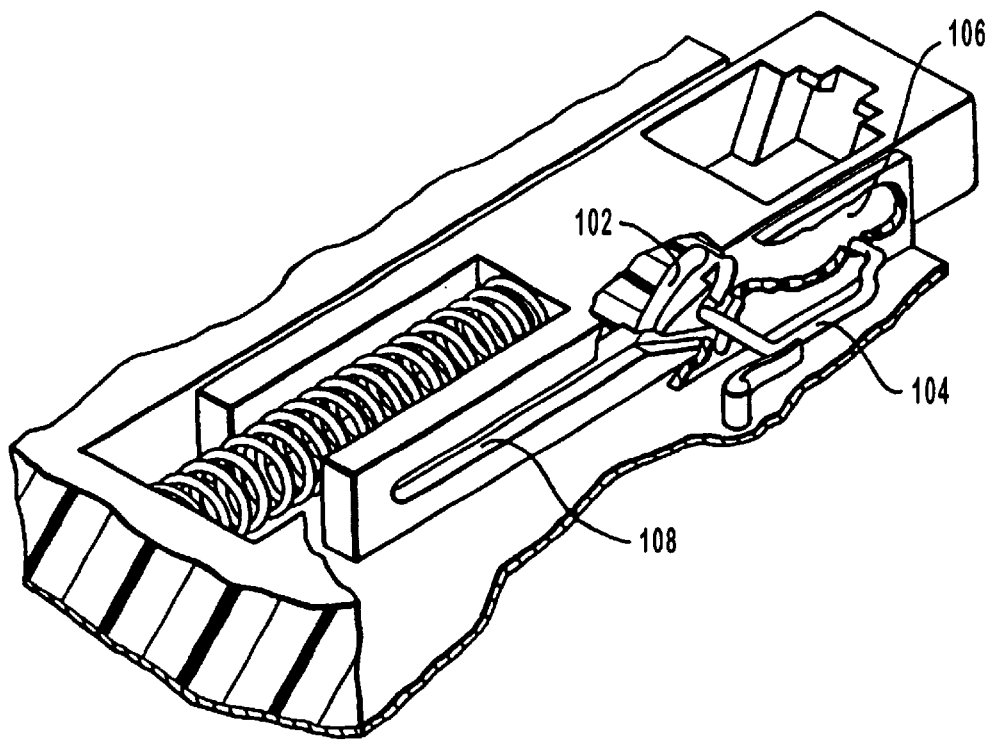
FIG. 47 is a partially cut away perspective view of a retractable aperture block of a communications card shown mounted within a remaining portion of a communications card.

FIG. 47 illustrates an alternate embodiment of the present invention incorporating a ratcheted groove 102 through which an actuating shaft 104 travels during exposure and retraction of aperture block 72.

In operation, travel of the retractable aperture block out of the computer results in travel of actuating shaft 104 progressing through chevron-shaped ratcheted groove 102. Indentations formed within the groove impart a ratcheting action preventing movement of actuating shaft 104 in a retrograde or counter-clockwise motion.

As retractable aperture block 72 is exposed outside of the computer housing, actuating shaft 104 is forced along a linear extended pathway 108 until reaching the end thereof. Further travel of retractable aperture block 72 is halted by contact between actuating shaft 104 and the end of linear extended pathway 108. When a user no longer requires exposure of retractable aperture block 72, retractable aperture block 72 may be manually reinserted through slot 76 until actuating shaft 104 leaves linear extended pathway 108 and continues in a clockwise motion through the chevron-shaped ratcheted groove 102.

According to another aspect of the present invention, a communications card such as communications card 70 illustrated in FIG. 47 provides means for selectively retaining the retractable aperture block of the communications card within the computer housing. By way of example and not limitation, the selective retention means of the embodiment illustrated in FIG. 47 comprise ratcheted groove 102, actuating shaft 104, and linear extended pathway 108.

Figure 48:
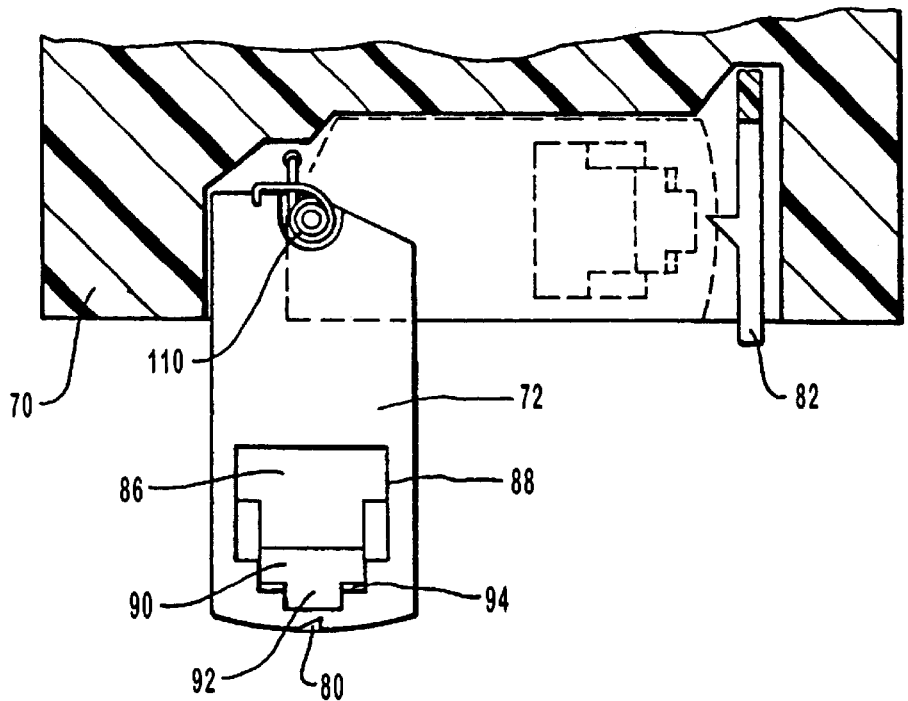
FIG. 48 is a plan of an thin-architecture communications card with an aperture block capable of being retracted wholly within the housing of the computer.

FIG. 48 illustrates an alternate embodiment of the communications card employing the teachings of the present invention. Retractable aperture block 72 is exposed from the computer housing through the use of a sprung wire 110.

According to another aspect of the present invention a communications card such as communications card 70 provides means for biasing the retractable aperture block of the communications card in a direction out of the computer housing. By way of example and not limitation, the biasing means employed in the embodiment illustrated in FIG. 15 comprise sprung wire 110. When a user no longer wishes access to retractable aperture block 72, the user merely presses aperture block 72 back within the confines of the computer housing such that retention notch 80 will be engaged by biased lever 82 to prevent inadvertent exposure of retractable aperture block 72 outside of the computer housing.

According to another feature of the present invention a communications card such as communications card 70 is provided with means for selectively retaining the retractable aperture block of the communications card within a computer housing. By way of example and not limitation, the selective retention means of the embodiment illustrated in FIG. 48 comprise retention notch 80 and biased lever 82.

Figure 49:
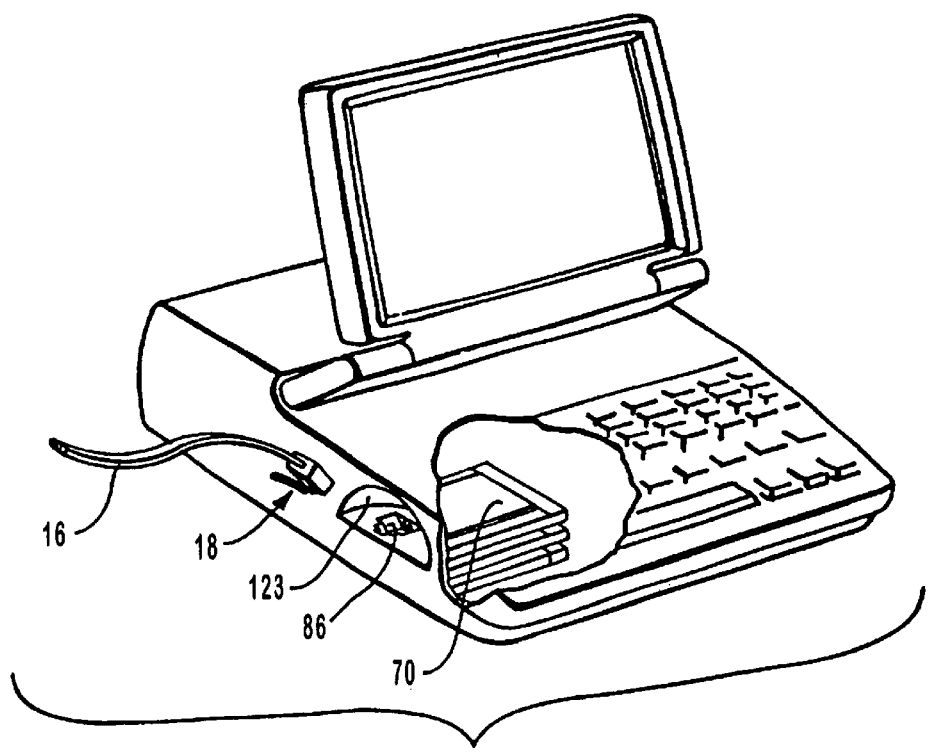
FIG. 49 is a perspective view of a computer housing formed so as to reveal the communications card installed therein.

FIG. 49 depicts the computer housing having formed therein an access tunnel 123. Access tunnel 123 allows direct access to communications card 70 from outside of the computer without the need to move communications card 70. Media connector 18 is inserted through access tunnel 123 directly into communications card 70 to provide a physical and electrical connection between the computer and telephone line 16.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States patent is:

1. An electrical apparatus that is capable of receiving a media plug, the media plug including a first end and an opposing second end, the electrical apparatus comprising:
   a casing forming at least a portion of an exterior surface of the electrical apparatus, the casing housing electronic circuitry and including a receiving portion; and
   an aperture block retractably connected to the casing, the aperture block movable between a first position in which the aperture block is substantially stored within the receiving portion and a second position in which the aperture block is substantially disposed outside the electrical apparatus; the aperture block comprising:
      a body including an outer first surface and an opposing outer second surface; and
      an aperture extending through the first surface, the body and the second surface, the aperture being sized and configured to receive the media plug, at least a portion of the opposing ends of the media plug projecting through the outer surfaces of the aperture block when the media plug is received within the aperture, the aperture block being configured to allow electrical communication between the media plug and the electrical apparatus.

2. The electrical apparatus of claim 1, further comprising a distance separating the first outer surface and the second outer surface of the aperture block, the distance being less than a length of the media plug.

3. An electrical apparatus that is capable of receiving a media plug, the media plug including a first end and an opposing second end, the electrical apparatus comprising:
   a casing forming at least a portion of an exterior surface of the electrical apparatus, the casing housing internal circuitry; and
   an aperture block projecting from the casing, the aperture block including a body with an outer first surface and an opposing outer second surface; and
   an aperture extending through the first surface, the body and the second surface of the aperture block, the aperture being sized and configured to receive the media plug, at least a portion of the opposing ends of the media plug projecting through the outer surfaces of the aperture block when the media plug is received within the aperture, the aperture block being configured to allow electrical communication between the media plug and the electrical apparatus.

4. The electrical apparatus as in claim 3, further comprising a contact wire projecting into the aperture.

5. The electrical apparatus as in claim 3, further comprising means for mechanically securing the media plug within the aperture.

6. The electrical apparatus as in claim 3, further comprising means for preventing the passage of the media plug completely through the aperture.

7. The electrical apparatus as in claim 3, further comprising a channel recessed within the aperture block, the channel being configured to receive at least a portion of the media plug.

8. The electrical apparatus as in claim 3, further comprising an opening formed in the casing and the aperture block being slidably positioned within the opening so as to enable the aperture block to be selectively moved between a first position wherein the aperture block projects from the casing through the opening and a second position wherein the aperture block is substantially enclosed within the casing.

9. The electrical apparatus as in claim 8, further comprising means for biasing the aperture block out of the casing in a direction external to the electrical apparatus.

10. The electrical apparatus as in claim 8, further comprising means for selectively retaining the aperture block in the first position or the second position.

11. The electrical apparatus as in claim 8, further comprising means for guiding the aperture block in and out of the casing.

12. The electrical apparatus as in claim 3, further comprising a ratcheted groove formed on an exterior surface of the aperture block and an actuating shaft mounted to the casing, the actuating shaft being disposed within the ratcheted groove when the aperture block is retraced within the casing.

13. The electrical apparatus as in claim 3, further comprising a guide track attached to the casing and a guide attached to the aperture block, wherein the guide engages the guide channel to control the movement of the aperture block.

14. The electrical apparatus as in claim 3, wherein the aperture block is rotatably attached to the casing.

15. An electrical apparatus that complies with Personal Computer Memory Card International Association standards for a communication card, the apparatus comprising:
- a housing containing electronic circuitry, the housing including a side wall with a height that complies with the Personal Memory Card International Association standards for a communication card;
- a receiving portion in the side wall of the housing;
- a retractable platform movably connected to the housing, the retractable platform having a height measured from a first surface to a second surface, the retractable platform movable between a first position in which at least a substantial portion of the retractable platform is disposed in the receiving portion in the side wall of the housing and a second position in which at least a substantial portion of the retractable platform is disposed outside of the receiving portion in the housing, the retractable platform capable of allowing physical engagement between the retractable platform and a connector attached to an electronic device, the connector having a height and a width that is greater than the height of the retractable platform, the physical engagement allowing communication between the electronic device and the electronic circuitry in the housing when the retractable platform is in the second position, the retractable platform requiring physical disengagement from the connector in the first position; and
- a biasing member connecting the retractable platform and the housing, the biasing member being sized and configured to bias the movement of the retractable platform between the first position and the second position.

16. The electrical apparatus as in claim 15, further comprising an aperture extending through the retractable platform, the aperture being sized and configured to receive a media plug.

17. The electrical apparatus as in claim 16, further comprising a first end of the media plug and an opposing second end of the media plug, the opposing ends of the media plug projecting from opposing sides of the retractable platform when the media plug is inserted into the aperture.

18. The electrical apparatus as in claim 16, further comprising an outer first surface of the retractable platform, an opposing outer second surface of the retractable platform and a thickness of the retractable platform measured from the outer first surface to the outer second surface, the thickness of the retractable platform being less than a length of the media plug.

19. The electrical apparatus as in claim 15, further comprising a guide track attached to the housing and a guide attached to the retractable platform, the guide engaging the guide track to guide the movement of the retractable platform between the first and second positions.

20. The electrical apparatus as in claim 15, further comprising a guide track formed in an outer surface of the retractable platform and a guide pin attached to the housing, the guide pin being disposed within the guide track to control the movement of the retractable platform between the first and second positions.

21. The electrical apparatus as in claim 15, further comprising a connector attached to an end of the housing, the connector capable of detachably connecting the electrical apparatus to a host device.

22. The electrical apparatus as in claim 15, further comprising a longitudinal axis that extends from one end of the housing to another end of the housing, the retractable platform slidably connected to the housing along the longitudinal axis.

23. An electrical apparatus that complies with Personal Computer Memory Card International Association standards for a communication card, the apparatus comprising:
- a housing containing electronic circuitry, the housing including a side wall with a height that complies with the Personal Memory Card International Association standards for a communication card;
- a receiving portion in the side wall of the housing;
- a retractable platform movably connected to the housing, the retractable platform having a height measured from a first surface to a second surface, the retractable platform movable between a first position in which at least a substantial portion of the retractable platform is disposed in the receiving portion in the side wall of the housing and a second position in which at least a substantial portion of the retractable platform is disposed outside of the receiving portion in the housing, the retractable platform capable of allowing physical engagement between the retractable platform and a connector attached to an electronic device, the connector having a height and width that is greater than the height of the retractable platform, the physical engagement allowing communication between the electronic device and the electronic circuitry in the housing when the retractable platform is in the second position, the retractable platform requiring physical disengagement from the connector in the first position; and
- a retaining member connected to the housing, the retaining member selectively retaining the retractable platform in the first position or the second position.

24. The electrical apparatus as in claim 23, further comprising an aperture extending through the retractable platform, the aperture being sized and configured to receive a media plug.

25. The electrical apparatus as in claim 24, further comprising a first end of the media plug and an opposing second end of the media plug, the opposing ends of the media plug projecting from opposing sides of the retractable platform when the media plug is inserted into the aperture.

26. The electrical apparatus as in claim 24, further comprising an outer first surface of the retractable platform, an opposing outer second surface of the retractable platform and a thickness of the retractable platform measured from the outer first surface to the outer second surface, the thickness of the retractable platform being less than a length of the media plug.

27. The electrical apparatus as in claim 23, further comprising a guide track attached to the housing and a guide attached to the retractable platform, the guide engaging the guide track to guide the movement of the retractable platform between the first and second positions.

28. The electrical apparatus as in claim 23, further comprising a guide track formed in an outer surface of the retractable platform and a guide pin attached to the housing, the guide pin being disposed within the guide track to control the movement of the retractable platform between the first and second positions.

29. The electrical apparatus as in claim 23, further comprising a connector attached to an end of the housing, the connector capable of detachably connecting the electrical apparatus to a host device.

30. The electrical apparatus as in claim 23, further comprising a longitudinal axis that extends from one end of the housing to another end of the housing, the retractable platform slidably connected to the housing along the longitudinal axis.

31. An electrical apparatus that complies with Personal Computer Memory Card International Association standards for a communication card, the apparatus comprising:
- a housing containing electronic circuitry, the housing including a side wall with a height that complies with the Personal Memory Card International Association standards for a communication card;
- a receiving portion disposed within the side wall of the housing;
- a retractable platform movably connected to the housing, the retractable platform having a height measured from a first surface to a second surface, the retractable platform movable between a first position in which at least a substantial portion of the retractable platform is disposed in the receiving portion in the side wall of the housing and a second position in which at least a substantial portion of the retractable platform is disposed outside of the receiving portion in the housing, the retractable platform capable of allowing physical engagement between the retractable platform and a connector attached to an electronic device, the connector having a height and width that is greater than the height of the retractable platform, the physical engagement allowing communication between the electronic device and the electronic circuitry in the housing when the retractable platform is in the second position, the retractable platform requiring physical disengagement from the object in the first position;
- a guide track formed in an outer surface of the retractable platform; and
- a guide pin attached to the housing, the guide pin being disposed within the guide track to control the movement of the retractable platform between the first position and the second position.

32. The electrical apparatus as in claim 31, further comprising an aperture extending through the retractable platform, the aperture being sized and configured to receive a media plug.

33. The electrical apparatus as in claim 32, further comprising a first end and an opposing second end of the media plug, the opposing ends of the media plug projecting from opposing sides of the retractable platform when the media plug is inserted into the aperture.

34. The electrical apparatus as in claim 32, further comprising an outer first surface of the retractable platform, an opposing outer second surface of the retractable platform and a thickness of the retractable platform measured from the outer first surface to the outer second surface, the thickness of the retractable platform being less than a length of the media plug.

35. The electrical apparatus as in claim 31, further comprising a connector attached to an end of the housing, the connector capable of detachably connecting the electrical apparatus to a host device.

36. The electrical apparatus as in claim 31, further comprising a longitudinal axis that extends from one end of the housing to another end of the housing, the retractable platform slidably connected to the housing along the longitudinal axis.

37. An electrical apparatus that is configured to allow communication with an external source, the electrical apparatus comprising:
- a thin-architecture communication card that is capable of processing electrical signals, the thin-architecture communication card including a side wall with a height that complies with the Personal Memory Card International Association standards for a communication card;
- a retractable connector connected to the side wall of the thin-architecture communication card, the retractable connector having a height measured from a first surface to a second surface, the retractable connector including a fixed portion that is capable of electrical communication with the communication card and a retractable portion that is capable of electrical communication with the fixed portion, the retractable portion selectively movable between a first position in which the retractable portion is generally enclosed within the communication card and a second position in which at least a portion of the retractable portion extends outwardly from the communication card; and
- an interface on the retractable portion of the retractable connector, the interface having dimensions larger than the height of the retractable connector, the interface being sized and configured to allow communication between the external source and the communication card.

38. The electrical apparatus of claim 37, wherein the thin-architecture communication card complies with the applicable standards for a Personal Computer Memory Card International Association Type III communication card.

39. The electrical apparatus of claim 37, wherein the thin-architecture communication card complies with the applicable standards for a Personal Computer Memory Card International Association Type III communication card.

40. The electrical apparatus of claim 37, further comprising a first retention notch in the retractable portion, a second retention notch in the retractable portion and a biased lever, the biased lever being sized and configured to maintain the retractable portion in the first position when the biased lever engages the first notch and maintain the retractable portion in the second position when the biased lever engages the second notch.

41. The electrical apparatus of claim 40, further comprising a biasing member connected to the retractable connector, the biasing member being sized and configured to bias the retractable portion of the connector into the second position.

42. The electrical apparatus of claim 37, further comprising a guide track extending outwardly from the fixed portion of the connector and a guide channel formed in the retractable portion of the connector, the guide track being at least partially disposed within the guide channel to guide the movement of the retractable portion of the connector between the first and second positions.

43. The electrical apparatus of claim 37, further comprising a guide track extending outwardly from the retractable portion of the connector and a guide channel formed in the fixed portion of the connector, the guide track being disposed within the guide channel to guide the movement of the retractable portion of the connector between the first and second positions.

44. The electrical apparatus of claim 37, further comprising a groove in the retractable portion of the connector and an actuating shaft disposed within the groove, the groove and actuating shaft cooperating to guide the retractable portion of the connector between the first and second positions.

45. The electrical apparatus of claim 44, wherein the groove includes an elongated pathway and a chevron-shaped portion, the elongated pathway and chevron-shaped portion cooperating to maintain the retractable portion of the connector in the first position or the second position.

46. The electrical apparatus of claim 44, further comprising a biasing member connected to the retractable connector, the biasing member being sized and configured to bias the retractable portion of the connector into the second position.

47. The electrical apparatus of claim 37, wherein the retractable portion of the connector generally moves along a longitudinal path between the first position and the second position.

48. The electrical apparatus of claim 37, wherein the retractable portion of the connector is rotatably disposed between the first position and the second position.

49. The electrical apparatus of claim 37, wherein the retractable portion of the connector is selectively detachable from the fixed portion of the connector.

50. The electrical apparatus of claim 37, further comprising a flexible wire interconnecting the retractable portion of the connector and the fixed portion of the connector, the flexible wire being sized and configured to allow electrical communication between the retractable portion of the connector and the fixed portion of the connector.

51. A thin-architecture communication card that is sized and configured to allow communication between an external source and an electronic device, the communication card comprising:

a housing including a sidewall with a height that complies with Personal Computer Memory Card International Association standards for a communication card;

a retractable connector connected to the sidewall of the housing, the retractable connector having a height measured from a first surface to a second surface, the retractable connector including a fixed portion and a retractable portion, the retractable portion being selectively movable between a first position in which the retractable portion is generally enclosed within the housing and a second position in which at least a portion of the retractable portion extends outwardly from the housing;

a groove in the retractable portion of the connector; and a protrusion extending into the groove in the retractable portion of the connector, the protrusion and groove cooperating to guide the retractable portion of the connector between the first and second positions.

52. The electrical apparatus of claim 51, wherein the thin-architecture communication card complies with the applicable standards for a Personal Computer Memory Card International Association Type III communication card.

53. The electrical apparatus of claim 51, wherein the thin-architecture communication card complies with the applicable standards for a Personal Computer Memory Card International Association Type II communication card.

54. The electrical apparatus of claim 51, wherein the protrusion is a guide track that extends outwardly from the fixed portion of the connector, the guide track being at least partially disposed within the groove to guide the movement of the retractable portion of the connector between the first and second positions.

55. The electrical apparatus of claim 51, wherein the protrusion is an actuating shaft, the groove and actuating shaft cooperating to guide the retractable portion of the connector between the first and second positions.

56. The electrical apparatus of claim 51, wherein the groove includes an elongated pathway and a chevron-shaped portion, the elongated pathway and chevron-shaped portion cooperating to guide the retractable portion of the connector between the first and second positions.

57. The electrical apparatus of claim 51, further comprising a biasing member connected to the retractable connector, the biasing member being sized and configured to bias the retractable portion of the connector into the second position.

* * * * *

UNITED STATES PATENT AND TRADEMARK OFFICE
CERTIFICATE OF CORRECTION

PATENT NO.      : 6,561,824 B1
DATED           : May 13, 2003
INVENTOR(S)     : D. Scott Beckham et al.

It is certified that error appears in the above-identified patent and that said Letters Patent is hereby corrected as shown below:

<u>Title page,</u>
Item [75], Inventors, change "Riverton, UT" to -- Grayslake, IL --
Item [57], ABSTRACT,
Line 11, before "wire" change "contract" to -- contact --
Item [56], References Cited, U.S. PATENT DOCUMENTS,
change "5,184,202" to -- 5,184,282 -- and reference "5,509,811," change "Hormic" to -- Homic --.

<u>Column 3,</u>
Line 62, before "opening" delete "an"

<u>Column 4,</u>
Line 3, after "selectively" change "pushed" to -- pushing --

<u>Column 14,</u>
Line 56, after "taken" change "along-line" to -- along line --

<u>Column 19,</u>
Line 22, before "aperture" change "a" to -- an --

<u>Column 28,</u>
Line 53, after "Type" change "III" to -- II --
Line 22, before "the retractable" change "maintain" to -- maintains --

Signed and Sealed this

Ninth Day of September, 2003

JAMES E. ROGAN
*Director of the United States Patent and Trademark Office*